United States Patent
Kenny et al.

(10) Patent No.: US 9,579,839 B2
(45) Date of Patent: *Feb. 28, 2017

(54) APPARATUS FOR EXTRUSION OF THERMOPLASTIC HANDRAIL

(75) Inventors: Andrew Oliver Kenny, Toronto (CA); Douglas James Weatherall, Bolton (CA); Viqar Haider, Markham (CA); Ronald Harold Ball, Cameron (CA); Alexander Stuart Caunce, Cobourg (CA)

(73) Assignee: EHC CANADA, INC., Oshawa (CA)

( * ) Notice: Subject to any disclaimer, the term of this patent is extended or adjusted under 35 U.S.C. 154(b) by 948 days.

This patent is subject to a terminal disclaimer.

(21) Appl. No.: 13/593,859

(22) Filed: Aug. 24, 2012

(65) Prior Publication Data
US 2012/0321734 A1 Dec. 20, 2012

Related U.S. Application Data

(62) Division of application No. 12/677,458, filed as application No. PCT/CA2008/001596 on Sep. 10, 2008, now abandoned.
(Continued)

(51) Int. Cl.
*B29C 47/06* (2006.01)
*B29C 47/14* (2006.01)
(Continued)

(52) U.S. Cl.
CPC .......... *B29C 47/027* (2013.01); *B29C 47/003* (2013.01); *B29C 47/0014* (2013.01);
(Continued)

(58) Field of Classification Search
CPC ............ B29C 47/0019; B29C 47/0021; B29C 47/003; B29C 47/0059; B29C 47/026;
(Continued)

(56) References Cited

U.S. PATENT DOCUMENTS 815,571 A * 3/1906 Williams ................ B21C 23/24
152/393
1,049,613 A 1/1913 Seeburger
(Continued)

FOREIGN PATENT DOCUMENTS

CA 898726 4/1972
CA 936569 11/1973
(Continued)

OTHER PUBLICATIONS

International Preliminary Report on Patentability issued Mar. 16, 2010 in respect of International Application No. PCT/CA2008/001596.
(Continued)

*Primary Examiner* — Alison L Hindenlang
*Assistant Examiner* — Joseph Leyson
(74) *Attorney, Agent, or Firm* — Bereskin & Parr LLP/S.E.N.C.R.L., s.r.l.

(57) ABSTRACT

A method and apparatus for extrusion of an article is provided. A die assembly can apply flows of thermoplastic material to an array of reinforcing cables to form a composite extrusion. A slider fabric can be bonded to one side of the composite extrusion. After exiting the die assembly, the slider fabric can act to support the extrudate as it passes along an elongate mandrel, which can cause the base of the slider fabric to change shape from a flat profile to the final internal profile of the article. The extruded article can then be cooled to solidify the material. The die can include cooling for the slider fabric and means for promoting penetration of the thermoplastic into reinforcing cables.

20 Claims, 24 Drawing Sheets

Related U.S. Application Data

(60) Provisional application No. 60/971,152, filed on Sep. 10, 2007.

(51) Int. Cl.

| | | |
|---|---|---|
| *B29C 47/86* | (2006.01) | |
| *B29C 47/02* | (2006.01) | |
| *B29C 47/88* | (2006.01) | |
| *B29C 47/28* | (2006.01) | |
| *B29C 47/00* | (2006.01) | |
| *B29C 47/90* | (2006.01) | |
| B29C 70/16 | (2006.01) | |
| B29K 105/10 | (2006.01) | |
| B29L 31/46 | (2006.01) | |
| B29L 29/00 | (2006.01) | |
| B29L 31/30 | (2006.01) | |
| B29L 31/00 | (2006.01) | |
| B29C 47/10 | (2006.01) | |
| B29C 47/34 | (2006.01) | |
| B29C 47/08 | (2006.01) | |
| B29K 105/20 | (2006.01) | |

(52) U.S. Cl.
CPC ...... *B29C 47/0016* (2013.01); *B29C 47/0019* (2013.01); *B29C 47/0059* (2013.01); *B29C 47/026* (2013.01); *B29C 47/065* (2013.01); *B29C 47/28* (2013.01); *B29C 47/884* (2013.01); *B29C 47/8805* (2013.01); *B29C 47/8815* (2013.01); *B29C 47/8845* (2013.01); *B29C 47/8865* (2013.01); *B29C 47/8895* (2013.01); *B29C 47/90* (2013.01); *B29C 47/908* (2013.01); *B29C 47/0898* (2013.01); *B29C 47/1036* (2013.01); *B29C 47/1045* (2013.01); *B29C 47/145* (2013.01); *B29C 47/34* (2013.01); *B29C 47/905* (2013.01); *B29C 47/906* (2013.01); *B29C 70/16* (2013.01); *B29K 2105/10* (2013.01); *B29K 2105/20* (2013.01); *B29L 2029/00* (2013.01); *B29L 2031/003* (2013.01); *B29L 2031/3029* (2013.01); *B29L 2031/463* (2013.01); *B29L 2031/709* (2013.01)

(58) Field of Classification Search
CPC . B29C 47/027; B29C 47/065; B29C 47/1036; B29C 47/1045; B29C 47/145; B29C 47/28; B29C 47/34; B29C 47/8815; B29C 47/884; B29C 47/8865
See application file for complete search history.

(56) References Cited

U.S. PATENT DOCUMENTS

| | | |
|---|---|---|
| 1,101,209 A | 6/1914 | Pitt |
| 1,186,550 A | 6/1916 | Cobb |
| 2,373,764 A | 4/1945 | Lautrup et al. |
| 2,669,339 A | 2/1954 | Hansen |
| 2,721,158 A | 10/1955 | Mans |
| 2,879,881 A | 3/1959 | Tilton |
| 2,956,662 A | 10/1960 | Hansen |
| 2,979,431 A | 4/1961 | Perrault |
| 3,039,142 A | 6/1962 | Zavasnik |
| 3,048,256 A | 8/1962 | Skinner |
| 3,212,627 A | 10/1965 | Beebee |
| 3,411,980 A | 11/1968 | Leshin |
| 3,414,109 A | 12/1968 | Clark |
| 3,463,290 A | 8/1969 | Tajima |
| 3,481,807 A | 12/1969 | Kanamori |
| 3,616,496 A | 11/1971 | Anglioletti et al. |
| 3,623,590 A | 11/1971 | Johnson |
| 3,633,725 A | 1/1972 | Smith |
| RE27,439 E | 7/1972 | Jackson |
| 3,689,341 A | 9/1972 | Ninomiya |
| 3,693,218 A | 9/1972 | Jaubert et al. |
| 3,724,645 A | 4/1973 | Spaar |
| 3,778,882 A | 12/1973 | Cameron et al. |
| 3,783,063 A | 1/1974 | Olsson |
| 3,783,704 A | 1/1974 | Lawson |
| 3,865,225 A | 2/1975 | Phal |
| 3,872,735 A | 3/1975 | Hnatek |
| 3,874,968 A | 4/1975 | Robinson |
| 3,885,071 A | 5/1975 | Blad et al. |
| 3,909,176 A | 9/1975 | Madonini |
| 3,949,858 A | 4/1976 | Ballocci et al. |
| 3,956,056 A | 5/1976 | Boguslawski et al. |
| 3,981,206 A | 9/1976 | Miranti, Jr. et al. |
| 4,032,384 A | 6/1977 | Rauscher |
| 4,034,617 A | 7/1977 | Guyer |
| 4,050,322 A | 9/1977 | Moring |
| 4,059,974 A | 11/1977 | Fleissner |
| 4,087,223 A | 5/1978 | Angioletti et al. |
| 4,093,499 A | 6/1978 | Naka |
| 4,134,883 A | 1/1979 | Mendelsohn et al. |
| 4,150,929 A * | 4/1979 | Brandt ................. B29C 47/027 425/114 |
| 4,161,769 A | 7/1979 | Elliott |
| 4,169,393 A | 10/1979 | Wetzel et al. |
| 4,274,821 A | 6/1981 | Kiemer |
| 4,359,501 A | 11/1982 | DiTullio |
| 4,381,273 A | 4/1983 | Azzola |
| 4,427,107 A | 1/1984 | Roberts et al. |
| 4,439,387 A | 3/1984 | Hawley |
| 4,469,729 A | 9/1984 | Watanabe et al. |
| 4,548,663 A | 10/1985 | Worcester |
| 4,563,140 A | 1/1986 | Turecek |
| 4,564,542 A | 1/1986 | Worcester |
| 4,578,024 A | 3/1986 | Sicka et al. |
| 4,581,807 A | 4/1986 | Adell |
| 4,600,549 A | 7/1986 | Rajala et al. |
| 4,618,387 A | 10/1986 | Fisher et al. |
| 4,650,446 A | 3/1987 | Pinto et al. |
| 4,656,086 A | 4/1987 | Bowers et al. |
| 4,681,646 A | 7/1987 | Pinto et al. |
| 4,767,244 A | 8/1988 | Peterson |
| 4,776,446 A | 10/1988 | Fisher et al. |
| 4,808,098 A | 2/1989 | Chan et al. |
| 4,839,220 A | 6/1989 | Stijntjes et al. |
| 4,852,713 A | 8/1989 | Tatai et al. |
| 4,891,040 A | 1/1990 | Nagai et al. |
| 4,904,425 A | 2/1990 | Hebels et al. |
| 4,934,100 A | 6/1990 | Adell |
| 4,946,020 A | 8/1990 | Rivera et al. |
| 4,948,354 A | 8/1990 | Minaudo |
| 4,957,199 A | 9/1990 | Wokke et al. |
| 4,982,829 A | 1/1991 | Johnson et al. |
| 5,020,256 A | 6/1991 | French |
| 5,083,985 A | 1/1992 | Alles |
| 5,087,488 A * | 2/1992 | Cakmakci ........... B29C 47/0019 264/177.1 |
| 5,096,645 A | 3/1992 | Fink |
| 5,115,900 A | 5/1992 | Nurnberg et al. |
| 5,160,009 A | 11/1992 | Iyoda et al. |
| 5,162,151 A | 11/1992 | Smith et al. |
| 5,165,643 A | 11/1992 | Shreiner |
| 5,255,772 A | 10/1993 | Ball et al. |
| 5,275,270 A | 1/1994 | Dobo |
| 5,299,362 A | 4/1994 | Baldinger |
| 5,508,103 A | 4/1996 | Cope |
| 5,681,652 A | 10/1997 | Cope |
| 6,086,806 A | 7/2000 | Weatherall et al. |
| 6,237,740 B1 | 5/2001 | Weatherall et al. |
| 6,395,210 B1 | 5/2002 | Head et al. |
| 6,673,431 B1 | 1/2004 | Ledzinski |
| 6,761,259 B1 | 7/2004 | Onodera et al. |
| 7,200,915 B2 | 4/2007 | Keun |
| 7,398,869 B2 | 7/2008 | Novacek et al. |
| 7,404,477 B1 | 7/2008 | Toennisson et al. |
| 7,594,570 B2 | 9/2009 | Miessbacher |
| 7,641,038 B2 | 1/2010 | El-Wardany et al. |

(56) References Cited

U.S. PATENT DOCUMENTS

| | | | |
|---|---|---|---|
| 7,766,150 B2 | 8/2010 | Guo et al. | |
| 8,006,823 B2 | 8/2011 | Holzner et al. | |
| 8,186,498 B2 | 5/2012 | Kawasaki et al. | |
| 8,206,528 B2 | 6/2012 | Qureshi | |
| 2002/0084169 A1 | 7/2002 | Schulte et al. | |
| 2005/0147702 A1 | 7/2005 | Higashi | |
| 2005/0173224 A1 | 8/2005 | Caunce | |
| 2006/0237284 A1 | 10/2006 | Miessbacher | |
| 2007/0102183 A1 | 5/2007 | Jotti et al. | |
| 2007/0125301 A1 | 6/2007 | Zhou et al. | |
| 2007/0126142 A1* | 6/2007 | Zhou | B29C 70/521 264/134 |
| 2009/0127067 A1 | 5/2009 | Guo et al. | |
| 2009/0218192 A1 | 9/2009 | Holzner et al. | |
| 2010/0117263 A1 | 5/2010 | Wesson et al. | |
| 2010/0283173 A1 | 11/2010 | Kenny et al. | |

FOREIGN PATENT DOCUMENTS

| | | |
|---|---|---|
| CA | 1048301 | 2/1979 |
| CA | 1163879 A | 3/1984 |
| CA | 1261583 | 9/1989 |
| CA | 2333553 A1 | 1/2000 |
| CA | 2343037 A1 | 3/2000 |
| CA | 2482620 A1 | 3/2005 |
| CN | 1139613 A | 1/1997 |
| CN | 1307537 A | 8/2001 |
| CN | 1097027 C | 12/2002 |
| CN | 100484739 C | 5/2009 |
| DE | 839624 | 5/1952 |
| DE | 860477 | 12/1952 |
| DE | 907996 | 4/1954 |
| DE | 1027539 | 4/1958 |
| DE | 1127279 | 4/1962 |
| DE | 1019958 | 12/1964 |
| DE | 1936192 | 5/1970 |
| DE | 2000266 | 7/1971 |
| DE | 2142098 | 3/1973 |
| DE | 2911753 A1 | 10/1980 |
| DE | 2916253 | 10/1980 |
| DE | 3149783 A1 | 7/1982 |
| DE | 3106253 A1 | 9/1982 |
| DE | 3113810 A1 | 10/1982 |
| DE | 3208916 A1 | 9/1983 |
| DE | 3433914 A1 | 3/1986 |
| DE | 3836788 C1 | 8/1989 |
| DE | 3704524 A1 | 11/1989 |
| DE | 3921887 A1 | 1/1991 |
| DE | 3921888 A1 | 1/1991 |
| DE | 3930351 A1 | 3/1991 |
| DE | 4118946 A1 | 5/1992 |
| EP | 0134545 A1 | 3/1985 |
| EP | 0185006 A1 | 6/1986 |
| EP | 0273479 A1 | 6/1988 |
| EP | 1831454 B1 | 3/2011 |
| EP | 2159184 B1 | 8/2014 |
| FR | 1244910 A | 11/1960 |
| FR | 2161856 | 7/1973 |
| FR | 2442935 | 6/1980 |
| GB | 1355039 | 5/1974 |
| GB | 2243163 | 10/1991 |
| JP | 51-10585 A | 1/1976 |
| JP | 52-16629 | 5/1977 |
| JP | 57-121684 A | 7/1982 |
| JP | 58-171594 | 10/1983 |
| JP | 58-222833 | 12/1983 |
| JP | 59-57878 A | 4/1984 |
| JP | S59-57464 U | 4/1984 |
| JP | 59-85728 | 5/1984 |
| JP | 62-189147 | 8/1987 |
| JP | 56-169886 A | 12/1987 |
| JP | 63-10266 Y2 | 3/1988 |
| JP | 2-277848 | 11/1990 |
| JP | 4-106092 | 4/1992 |
| JP | 4-185788 | 7/1992 |
| JP | 4-194011 | 7/1992 |
| JP | 06-071780 A | 3/1994 |
| JP | 7-33376 A | 2/1995 |
| JP | H07-047583 A | 2/1995 |
| JP | 7-206351 | 8/1995 |
| JP | 2000-071353 A | 3/2000 |
| JP | 2002255470 A | 9/2002 |
| JP | 2003-327380 A | 11/2003 |
| JP | 2006-076069 A | 3/2006 |
| JP | 2007084979 | 4/2007 |
| JP | 2007246176 | 9/2007 |
| JP | 4463052 B2 | 5/2010 |
| JP | 2012-11718 A | 1/2012 |
| JP | 5772744 B2 | 9/2015 |
| SU | 1717393 A1 | 3/1992 |
| TW | 460405 B | 10/2001 |
| WO | 00/01607 A1 | 1/2000 |
| WO | 0156914 A1 | 8/2001 |
| WO | 2005/028231 A1 | 3/2005 |
| WO | 2006/110136 A1 | 10/2006 |
| WO | 2007/075162 A1 | 7/2007 |
| WO | 2007/123534 A1 | 11/2007 |
| WO | 2009/033270 A1 | 3/2009 |
| WO | 2009/033272 A1 | 3/2009 |
| WO | 2009/033273 A1 | 3/2009 |
| WO | 2014/175051 A1 | 10/2014 |
| WO | 2015/046041 A1 | 4/2015 |
| WO | 2015/182739 A1 | 12/2015 |

OTHER PUBLICATIONS

International Search Report issued Dec. 23, 2008 in respect of International Application No. PCT/CA2008/001596.
Non-final rejection and related documents issued Nov. 6, 2012 in respect of parent U.S. Appl. No. 12/677,458.
Extended European Search Report issued Aug. 10, 2015 in respect of European Application No. 08800300.9.
Elevator World, Patents, Dec. 1990, p. 87.
Eckstein et al., Thermoforming Thermoplastic Polyurethanes, Plastics Engineering, May 1995, p. 29.
Declaration of Andrew Oliver Kenny, Oct. 27, 2014.
Written Opinion and International Search Report issued Aug. 16, 2016 in respect of International Application No. PCT/CA2016/050708.

* cited by examiner

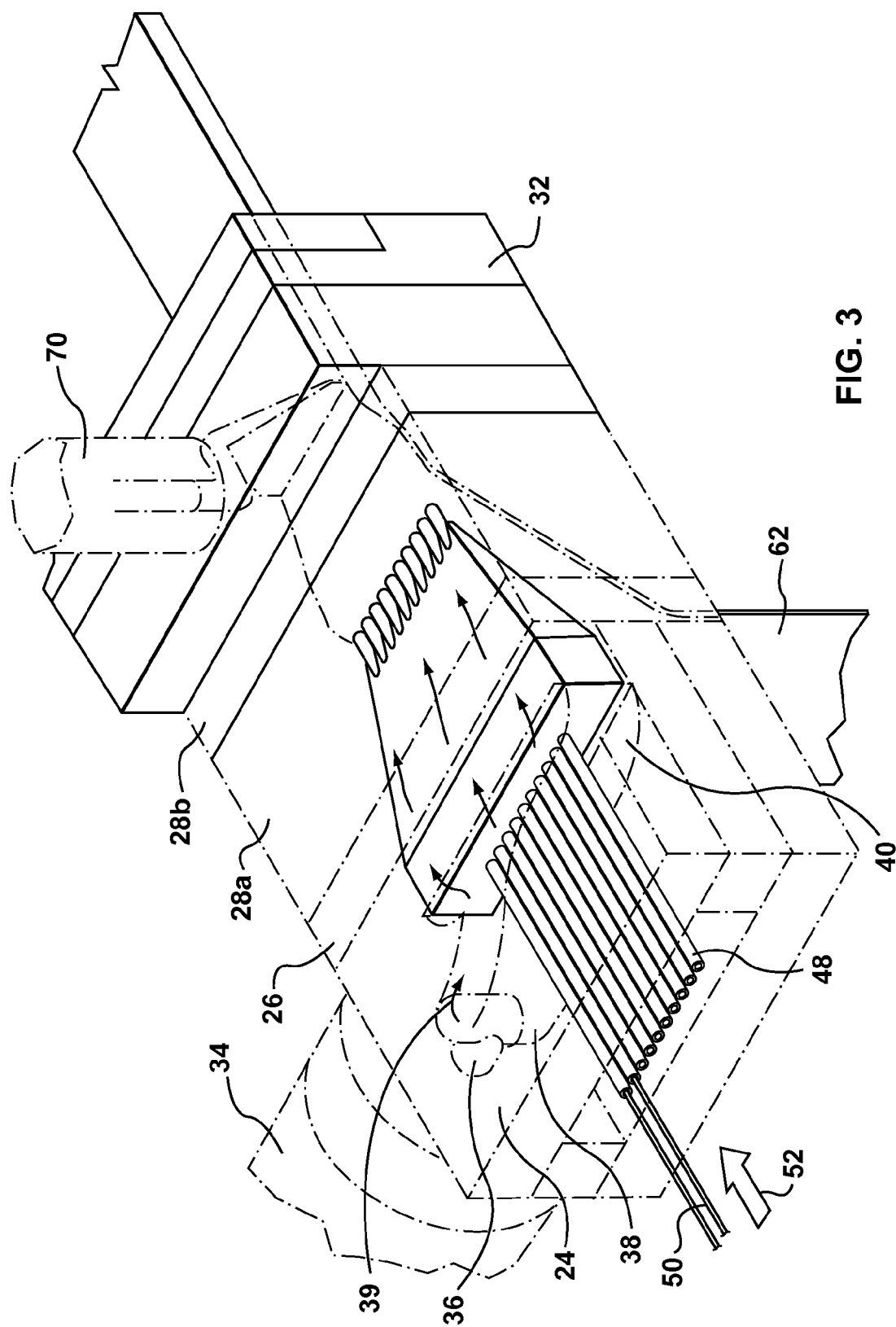

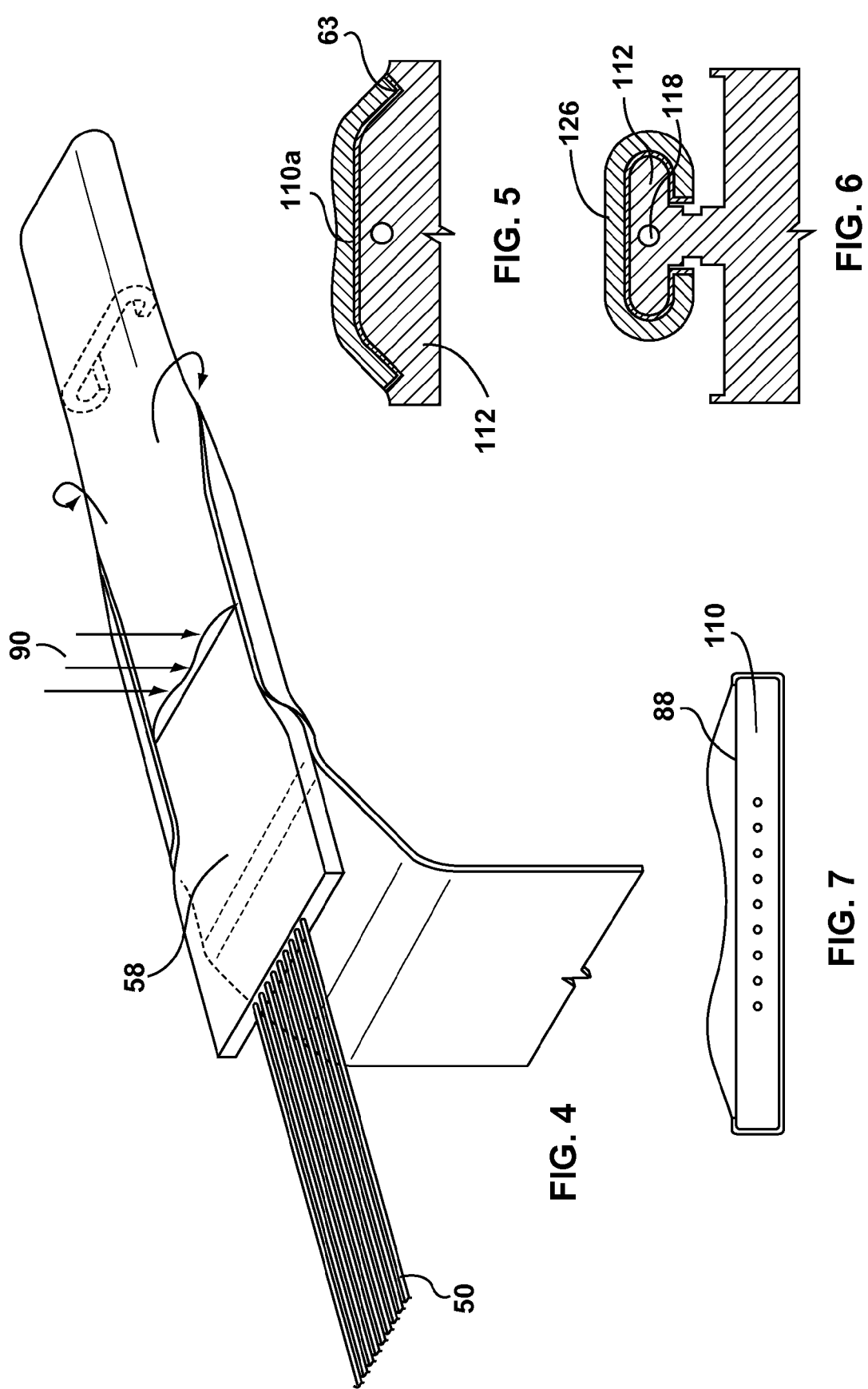

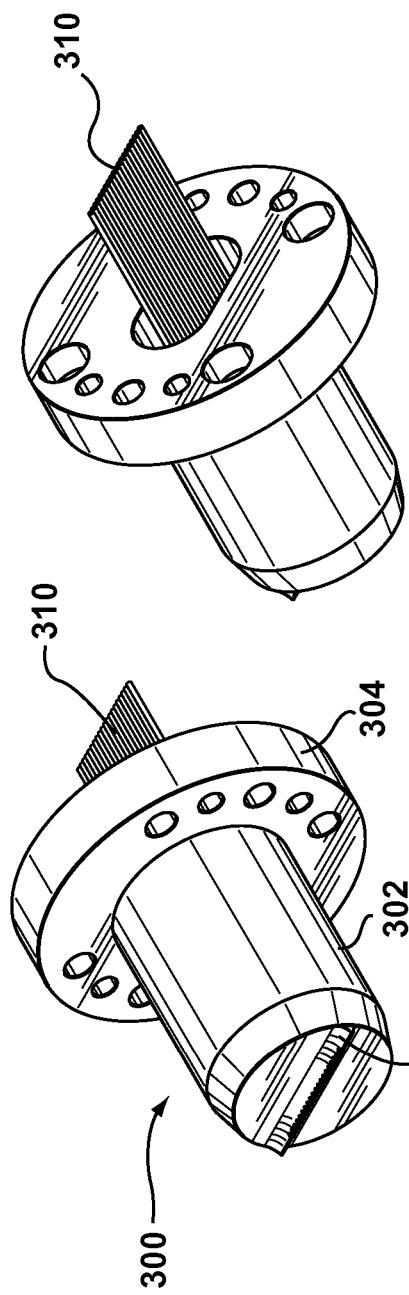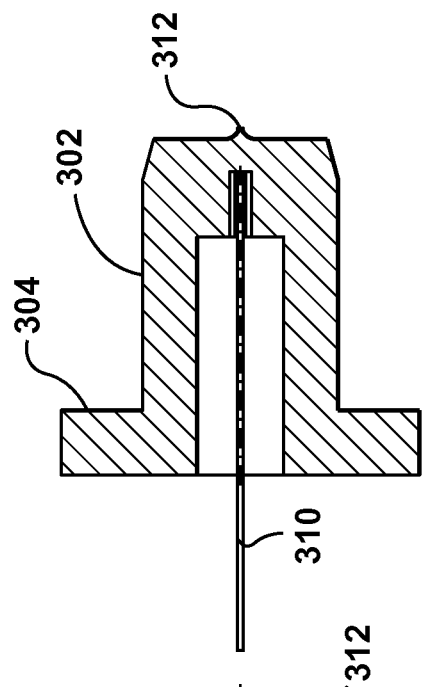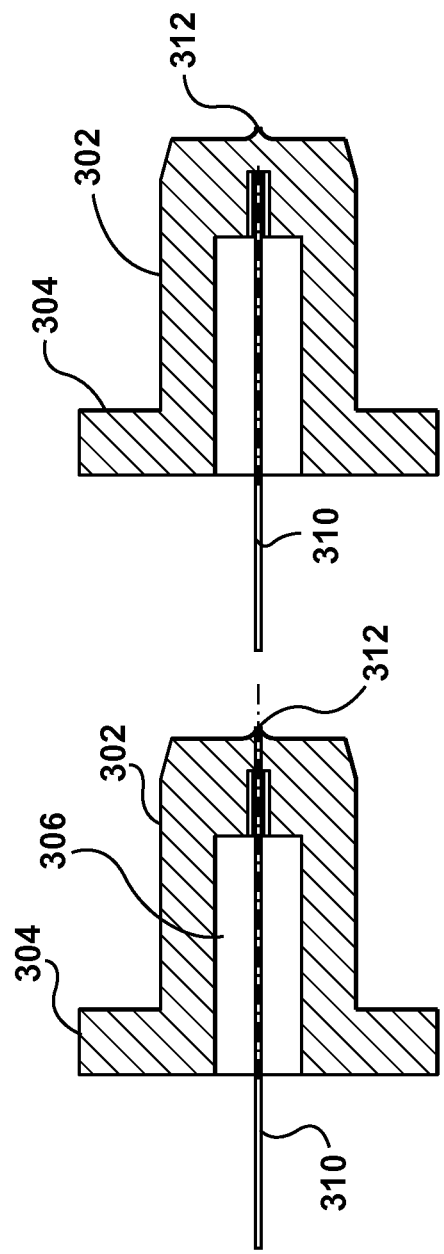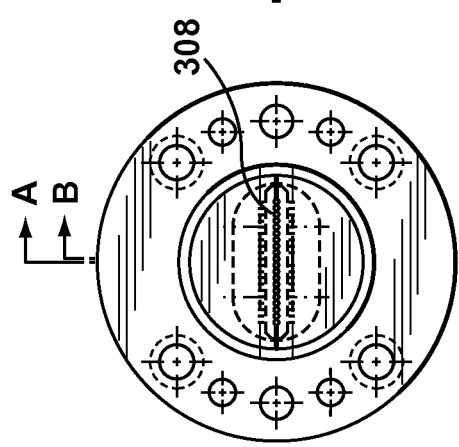
FIG. 17a  FIG. 17b  FIG. 17c  SECTION B-B FIG. 17d  SECTION A-A FIG. 17e

SECTION B-B

APPARATUS FOR EXTRUSION OF THERMOPLASTIC HANDRAIL

CROSS REFERENCE TO RELATED APPLICATIONS

This application is a divisional of U.S. application Ser. No. 12/677,458 filed Mar. 10, 2010, which is a National Stage Entry of PCT/CA2008/001596 filed Sep. 10, 2008, which claims the benefit of U.S. Provisional Application No. 60/971,152 filed Sep. 10, 2007, and each of which is hereby incorporated herein by reference in its entirety.

FIELD

This specification relates generally to thermoplastic handrails for escalators, moving walkways and other transportation apparatus, and to a method and apparatus for manufacture of such a handrail or other article that has a substantially constant cross section by a continuous extrusion technique.

BACKGROUND

The following paragraphs are not an admission that anything discussed in them is prior art or part of the knowledge of persons skilled in the art.

Handrails are a known and standard part of any escalator, moving ramp, moving walk or other similar transportation apparatus. Conventionally, such handrails are formed largely of rubber, which makes up the outer cover of the handrail and forms a comfortable exterior "C" shape to be grasped by a user, and also include steel reinforcing cables and fabric plies, which act to provide dimensional stability to the handrail.

To locate the handrail and enable it to travel freely, it is provided with a T-shaped slot on the underside. This slot engages a corresponding T-shaped section or guide made from polished steel, plastic or the like and provided along the escalator, and at either end is engaged by large pulley wheels, curved guides, or rollers. Underneath the escalator, appropriate drive mechanisms are provided. To enable the handrail to slide freely, the T-shaped slot is conventionally lined with a fabric, which may be cotton or a synthetic material, which is usually referred to as a "slider".

Additionally, handrails are usually reinforced longitudinally with steel cables or other relatively inextensible material, as a stretch inhibitor to provide sufficient resistance to stretching in the longitudinal direction. A handrail requires the incorporation within the body of the handrail of a number of reinforcing elements, or plies, to make the handrail sufficiently stiff, at least laterally, to resist both accidental and deliberate derailment of the handrail from the guide, while not detracting from its longitudinal flexibility. These plies are usually fabric having orthotropic properties, that is, they exhibit a certain degree of stiffness in one direction while remaining more flexible in the other. The stretch inhibitor at least must be reasonably precisely located and, more importantly, should generally be located at a uniform depth on a common neutral bending axis, so as to enable the handrail to flex freely as it passes around pulleys etc. The handrail requires the formation of a T-shaped slot, which additionally has to be provided with a slider layer, which is bonded on just one side to the handrail. The T-shaped slot must be accurately formed, to ensure that the handrail is securely retained in position in use.

Because of these requirements, handrails have traditionally been manufactured in a piece wise manner. This has also required the use of rubberized fabric. The plies of rubberized fabric, cords and raw rubber are stacked together, assembled in a mold and compression molded under heat and pressure to cure and mold the composite into the characteristic handrail C-shape. The mold is typically of the order of 10 to 20 feet long, enabling such lengths of handrail to be molded at once. Once each section has been molded, the handrail is moved forward by the length of the mold. The next section is then molded. In this manner the entire length of a single handrail is fabricated and cured except for approximately 5 feet at each end; these ends are then spliced together, molded and cured to form an endless handrail. This manufacturing process is laborious, requires considerable manual labour, and leads to a production rate dictated by the speed of curing reaction of the rubber, typically of the order of 10 minutes, and the length of the mold.

A handrail in use is located on a T-section member. The ability of a handrail to withstand accidental or deliberate displacement depends to a significant extent on the lateral stiffness or lip-strength of the handrail. A major component of an extruded handrail is the elastomeric material, and a key factor is the hardness of the elastomeric material. Selection of the hardness of the elastomeric material, as well as other materials, is a compromise between lateral stiffness and longitudinal flexibility. The handrail must have sufficient longitudinal flexibility to enable it to follow a handrail guide around turnarounds at the ends of an escalator or moving walk. It must also be capable of following the various pulleys through the drive mechanism and back underneath the handrail.

Despite these requirements, as a handrail has a uniform cross-section, it theoretically could be made in continuous lengths, for later cutting to size for individual applications; thus it can be suited to production by an extrusion technique.

U.S. Pat. No. 4,087,223 to Angioletti et al. discloses an extrusion device and the continuous manufacture of a handrail of elastomeric material, C-shaped in cross section. The extrusion device is provided with separate and distinct openings for the introduction of the various elements of the handrail, and with means which shape continuously said elements and arrange them continuously in mutual correct position into elastomeric material.

U.S. Pat. No. 6,237,740 to Weatherall et al. discloses a moving handrail construction, for escalators, moving walkways and other transportation apparatus having a generally C-shaped cross-section and defining an internal generally T-shaped slot. The handrail is formed by extrusion and comprises a first layer of thermoplastic material extending around the T-shaped slot. A second layer of thermoplastic material extends around the outside of the first layer and defines the exterior profile of the handrail. A slider layer lines the T-shaped slot and is bonded to the first layer. A stretch inhibitor extends within the first layer. The first layer is formed from a harder thermoplastic than the second layer, and this has been found to give improved properties to the lip and improved drive characteristics on linear drives.

INTRODUCTION

The following paragraphs are intended to introduce the reader to the more detailed description that follows and not to define or limit the claimed subject matter.

A method of extruding an article of constant cross-section and including a first thermoplastic material, a stretch inhibitor and a web of fabric on one side of the article is provided. The method comprises the steps of: supplying the stretch inhibitor to a die assembly; supplying the first thermoplastic material to the die assembly in a molten state, the extrusion temperature of the first thermoplastic material being below a melting point of the stretch inhibitor; bringing the first thermoplastic material together with the stretch inhibitor, thereby to embed the stretch inhibitor within the first thermoplastic material; supplying an elongate flexible web fabric of constant width, the extrusion temperature of the first thermoplastic material being below a melting point of the fabric; bringing the fabric up against the first thermoplastic material, the first thermoplastic material, the stretch inhibitor and the fabric thereby forming a composite extrudate; and permitting the extrudate to cool and solidify.

Another method of extruding an article of constant cross-section and including a thermoplastic material and a web of fabric on one side of the article comprises the steps of: supplying the thermoplastic material to a die assembly in a molten state; supplying an elongate flexible web of fabric of constant width; extruding the thermoplastic material out of the die assembly to form an extrudate of intermediate cross-section, while maintaining the thermoplastic material at a temperature above the crossover temperature of the materials such that the material is molten but sufficiently viscous to be stable; and bringing the fabric up against the thermoplastic material to complete the article of constant cross-section.

A method of forming a handrail by continuous extrusion comprises the steps of: combining together a thermoplastic elastomer in a molten state, a stretch inhibitor and a reinforcing slider fabric, to form a handrail of a desired cross-section, the thermoplastic material being above a crossover temperature of the elastomer, so as to be in an initially molten state but sufficiently viscous to be stable; and cooling the handrail along the length thereof from the exterior to solidify a substantial external layer around the exterior of the handrail and subsequently cooling and solidifying the interior of the handrail to prestress the handrail thereby to provide improved lip strength.

An apparatus for extruding an article of uniform cross-section comprises: die assembly having a first inlet for a thermoplastic material, an entrance slot for introducing an elongate fabric for bonding to one side of the thermoplastic material, an outlet die for forming an extrudate comprising at least the thermoplastic material with an intermediate cross-section, and a primary mandrel extending from the outlet die and having a support surface for supporting the extrudate while still in a molten state, with the fabric abutting the mandrel for relative sliding movement, the support surface at one end adjacent the outlet die corresponding to the profile of one side of the intermediate extrudate and progressively changing along the length of the primary mandrel to the final profile, at the other end thereof, the final profile corresponding to a desired final cross-section for the extrudate.

Another apparatus comprises: a die assembly having an entrance for introducing a stretch inhibitor, a first inlet for a thermoplastic material, an entrance slot for introducing an elongate fabric for bonding to one side of the thermoplastic material, a combining zone including a duct for combined extrusion flow with the entrance opening into the combining zone and first and second primary manifolds connected between the first inlet of the die assembly and the duct, for supplying the thermoplastic material into the duct as a first flow from the first primary manifold on one side of the stretch inhibitor and as a second flow from the second primary manifold on the other side of the stretch inhibitor, for embedding the stretch inhibitor within the combined extrusion flow, the fabric being brought up against the combined extrusion flow after embedding the stretch inhibitor therein, and an outlet die forming an extrudate comprising at least the thermoplastic material and the stretch inhibitor.

A method of extruding an article of constant cross-section including a thermoplastic material and a stretch inhibitor comprises the steps of: supplying a stretch inhibitor to a die assembly; supplying the thermoplastic material to the die assembly in a molten state at a temperature below the melting temperature of the stretch inhibitor; and passing the stretch inhibitor and the thermoplastic material through an element of restricted flow cross-section, to generate back pressure tending to cause penetration of the thermoplastic material into the stretch inhibitor.

A die assembly for extruding an article including a thermoplastic elastomer and a stretch inhibitor comprises: a first inlet for a thermoplastic elastomer; an entrance for the stretch inhibitor; a combining zone wherein the stretch inhibitor is embedded in the thermoplastic elastomer; and an element of restricted flow cross-section, through which the thermoplastic elastomer and the stretch inhibitor pass, whereby the element of restricted flow cross-section generates back pressure to promote penetration of the thermoplastic elastomer into the stretch inhibitor.

A method of extruding an article of constant cross-section including thermoplastic material and a stretch inhibitor comprises: supplying stretch inhibitor to a die assembly; supplying the thermoplastic material to the die assembly in a molten state at a temperature below the melting temperature of the stretch inhibitor, so that the stretch inhibitor is embedded in the thermoplastic material; supplying an elongate web of fabric to the die assembly and causing the fabric to bond to one side of the thermoplastic material; and at least one of: (i) cooling the die assembly in contact with the fabric; and (ii) providing at least some thermal isolation of an element of the die assembly in contact with the fabric, to reduce heat transfer to the fabric.

A die assembly for extruding an article including a thermoplastic material and a stretch inhibitor comprises: a first inlet for a thermoplastic material; an entrance for the stretch inhibitor; a combining zone wherein the stretch inhibitor is embedded in the thermoplastic elastomer; an inlet slot for an elongate web of fabric; and an element of the die assembly that contacts the fabric during passage through the die assembly and that includes at least one of: (i) cooling for the element; and (ii) thermal separation from other elements of the die assembly to reduce heat transfer to the fabric.

A die assembly for extruding an article including thermoplastic material and a cable array for inhibiting stretch comprises: a cable mandrel for supplying cables; at least one first runner plate secured to the cable mandrel, the at least one first runner plate connected to a first inlet for receiving a supply of a first thermoplastic material, the at least one first runner plate including channels for directing flow of the first thermoplastic material to embed the cables supplied by the cable mandrel; and at least one second runner plate secured to the at least one first runner plate, the at least one second runner plate connected to a second inlet for receiving a supply of a second thermoplastic material, the at least one second runner plate including channels for directing flow of the second thermoplastic material onto the first thermoplastic material.

These and other aspects of this specification are applicable to handrails, conveyor belts and a variety of other articles. For example, extrusion methods and apparatuses describe herein could be applied to the production of door and other trim for vehicles, which can comprise a thermoplastic material, a flocked surface, and optionally, a metallic layer or the like. The cooling technique described herein has the advantage of prestressing the extruded article. For handrails this provides improved lip strength. For door trim and the like, it can bias the sides inwards, to provide better grip.

These and other aspects or features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way. In the drawings:

FIG. 3 is a perspective view of a tube assembly for reinforcing cables, with other elements of the die assembly shown in ghost outline;

FIG. 4 is a schematic, perspective view showing formation of the profile within the die;

FIGS. 5 and 6 show progressive formation of the handrail profile after exit from the die;

FIG. 7 shows a cross-section through the extrusion at the die exit;

FIGS. 17a and 17b are perspective views from different ends of a cable mandrel forming part of the die assembly;

FIG. 17c is an end view of the cable mandrel of FIGS. 17a and 17b;

FIGS. 17d and 17e are cross-sectional views along lines BB and AA, respectively, of FIG. 17c;

DESCRIPTION OF VARIOUS EMBODIMENTS

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Figure 1:
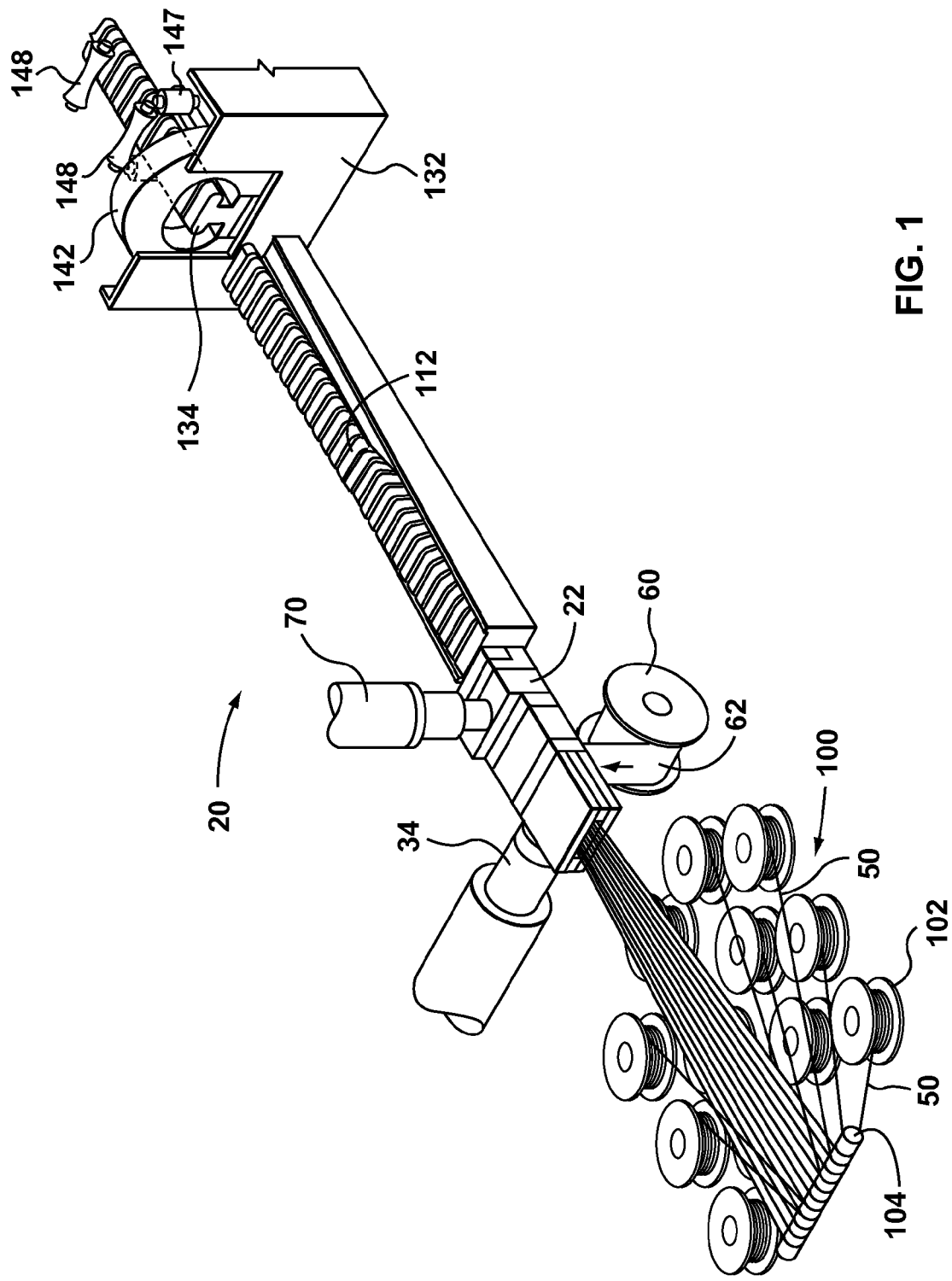
FIG. 1 is a perspective view of an extrusion apparatus.

Referring first to FIG. 1, an example apparatus is generally denoted by the reference 20. The apparatus 20 includes a number of principal components, including a die assembly 22, a cable supply unit 100, and a mechanism 60 for mounting a roll of slider fabric.

For a handrail, the thermoplastic is a thermoplastic elastomer, of a selected hardness. As shown, the die assembly 22 has a main, primary inlet 34 and a secondary inlet 70, for hot, molten thermoplastic. The inlets 34, 70 can be outlets from conventional screw extrusion machines. Any suitable machines can be provided which are capable of providing the desired material at the required temperature and pressure conditions. As detailed below, the machines must be capable of supplying the material at desired flow rates.

Extending from the die assembly 22 is a mandrel 112, 134. As detailed below, the mandrel 112, 134 can be in a number of separate sections, which are connected together, and as discussed below, at least the leading portions are provided with a vacuum feed to ensure that the handrail adopts a proper internal profile.

Figure 2A:
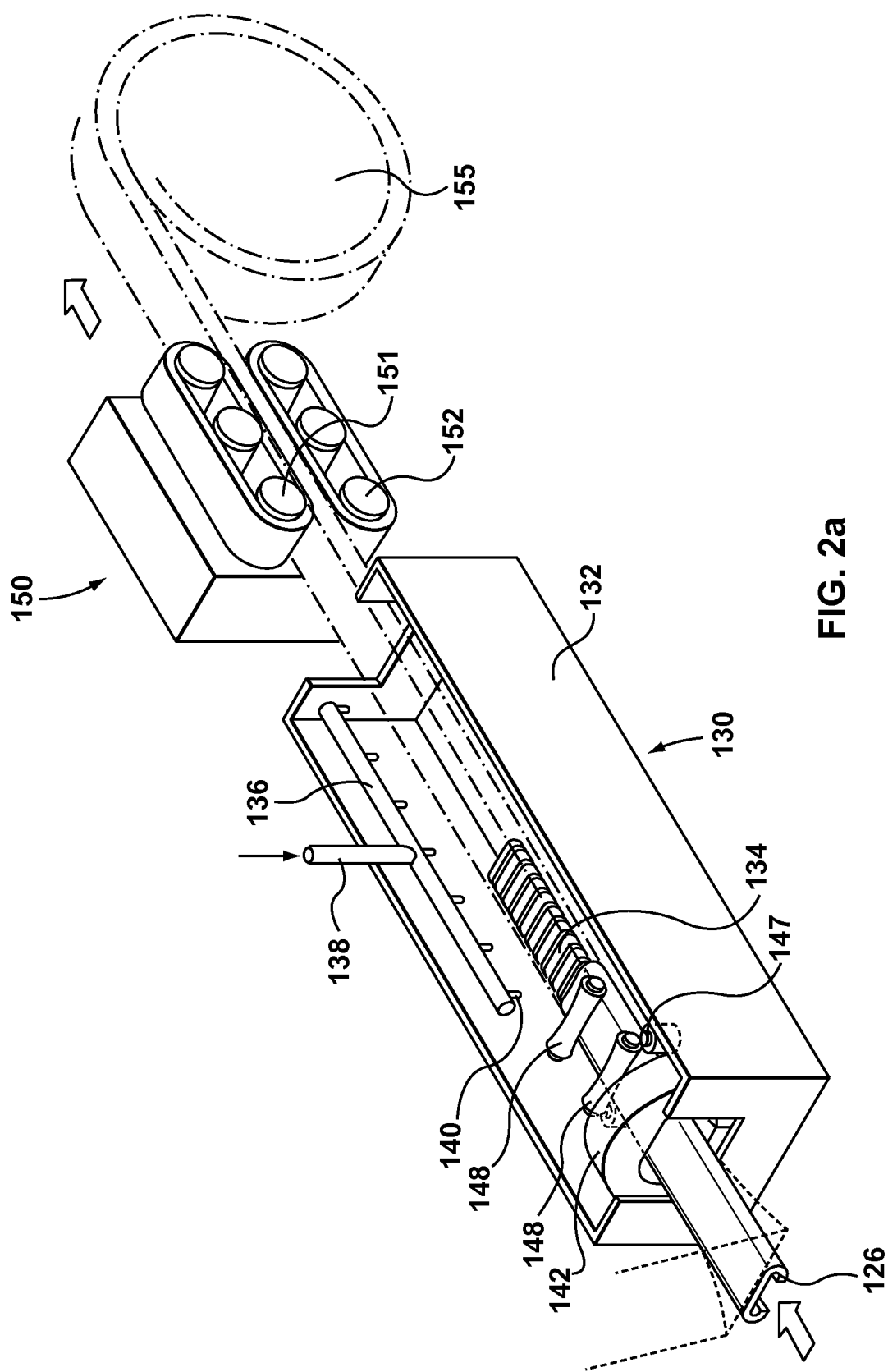
FIG. 2a is a perspective view of a cooling tank and take up assembly for a handrail.

Referring to FIG. 2a, the mandrel 112, 134 passes into a trough or tank 132 for cooling the handrail. On leaving the tank 132, the handrail passes through a drive unit 150, and is then taken up on a take up roller 155.

Figure 11:
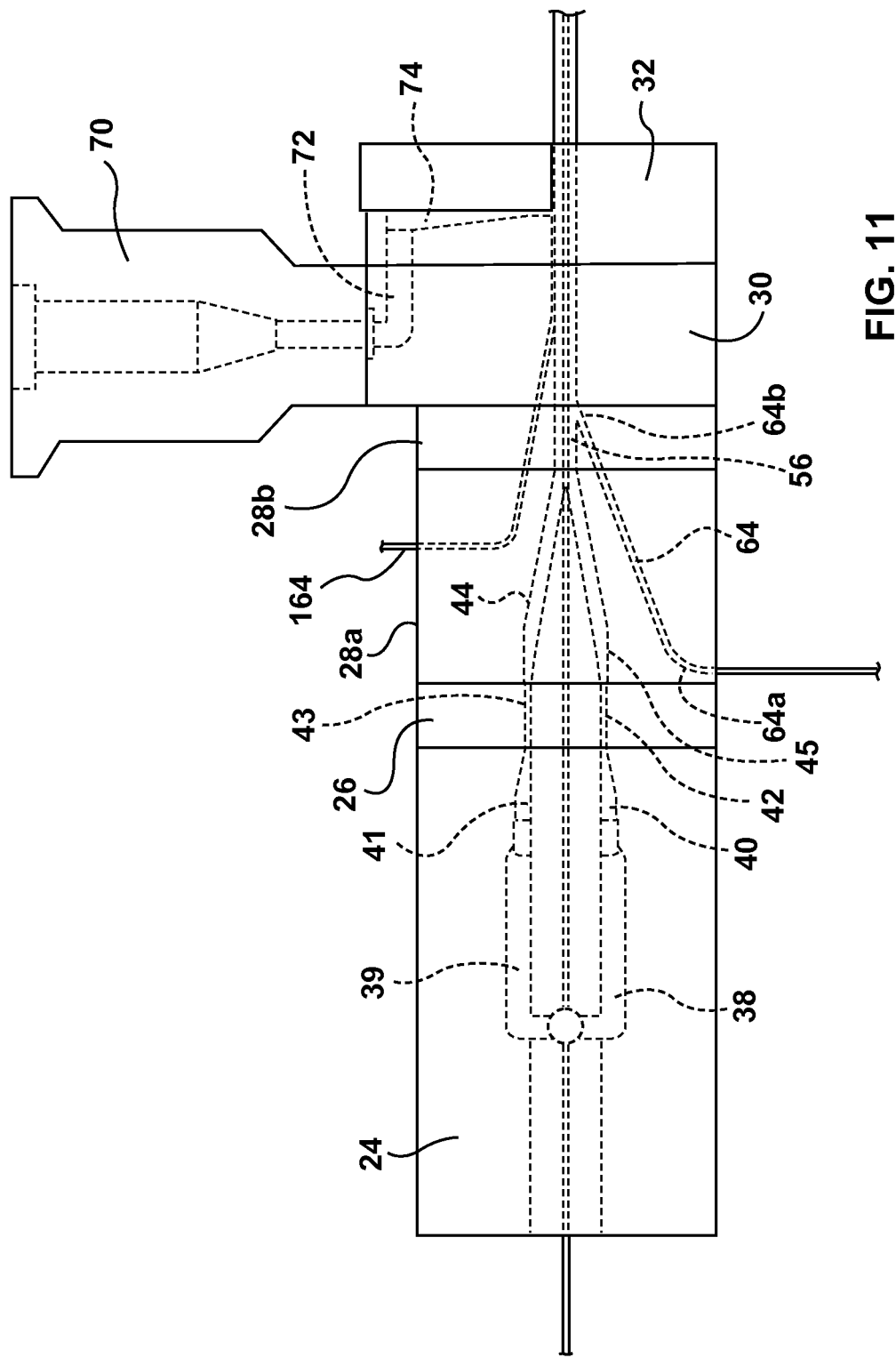
FIG. 11 is a side view showing, in ghost outline, various passageways within the die.
Figure 12:
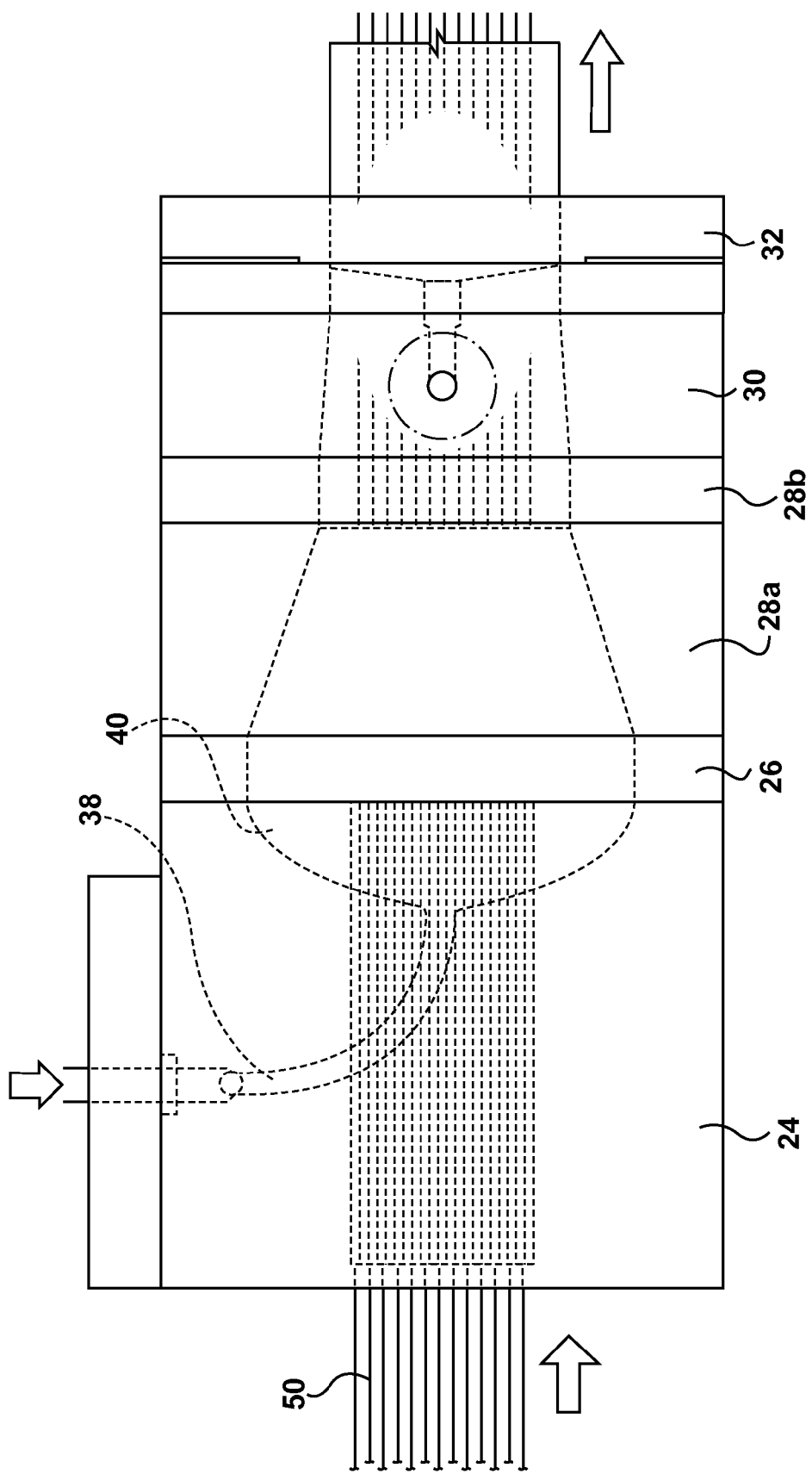
FIG. 12 is a plan view showing, in ghost outline, passageways within the die.

Details of the die assembly 22 will now be described in relation to FIGS. 3, 4, 7, 9, 11 and 12. Firstly, as best shown in FIGS. 11 and 12, the die assembly 22 comprises a number of separate zones that are connected together to form a complete die assembly.

In an inlet zone 24 the polymer from the inlet 34 is divided into two streams or flows, above and below a cable array. Next to this, there is a choke zone 26 in which relatively narrow passageways are provided, to choke the polymer flow and provide uniform back pressure, so that the two streams have substantially equal flow.

Next there is a cable combining zone 28. This comprises an upstream zone 28a in which the upper and lower streams of polymer are brought together above and below the cable array, and a downstream zone 28b, in which the polymer uniformly sandwiches the cable array to embed the cables therein. As described below, a comb can be implemented to generate back pressure to encourage the polymer to penetrate the cable array.

The next zone is a slider combining zone 30. Here a layer of slider fabric is brought up against the extrusion profile formed.

Finally, there is an outlet zone 32, in which a secondary flow of polymer is introduced and combined with the combined extrusion flow, for forming an outer layer of the handrail.

Referring now to FIG. 3, the first inlet 34 is connected to the outlet of a conventional screw extruder; any suitable extrusion machine can be used which is capable of delivering the selected elastomer or other thermoplastic at the required temperature and pressure conditions. Optionally, a melt pump could be used in addition to the screw extruder. Alternatively, a twin screw extruder could be used in place of the conventional screw extruder, the twin screw extruder enabling use of a polymer blend.

A short inlet duct 36 branches and is connected to bottom and top distribution ducts 38, 39. FIG. 11 shows clearly the separate ducts 38, 39 while FIG. 12 shows, in plan view how the ducts 38, 39 curve through 90° and are connected to a first or bottom manifold 40 and a second or top manifold 41. As such the inlet 34 provides a first inlet means. It will be appreciated that this first inlet means could alternatively be provided by two separate extruders separately connected to the two ducts 38, 39.

The manifolds 40, 41 distribute the flow evenly across the desired width, and continue into a first or bottom and second or top chokes 42, 43. The chokes 42, 43 can have a constant width, but, as seen in FIG. 11, their depth can be considerably reduced, as compared to the manifolds 40, 41. The reason for this is to provide controlled flow resistance in each of the top and bottom channels, so as to ensure desired flows through the top and bottom channels. The top choke 43 can have a greater width than the bottom choke 42, so as to provide a greater flow. This effectively maintains the cable array towards the bottom of the combined extrusion flow, as desired.

The chokes 42, 43 continue into bottom and top combining ducts 44, 45. These ducts 44, 45 have a greater depth as seen in FIG. 11, and their width tapers inwardly, as shown in FIG. 12, to a width corresponding to the width of a slider fabric.

Now, as best seen in FIG. 3, an intermediate wedge-shaped block 46 separates the chokes 42, 43 and combining ducts 44, 45. A plurality of tubes 48 are mounted in the block 46. The tubes 48 are dimensioned to closely fit cables 50 for reinforcing the handrail, as detailed below, while permitting free sliding movement of the cables 50, as indicated by arrow 52 in FIG. 3.

The tubes 48 end at the downstream combining zone 28b. Although not shown, adjacent the end of the tubes 48, there can be a comb extending across the duct. For test purposes with a relatively low production rate, this comb can be provided to generate sufficient back pressure to cause the polymer to penetrate the cables 50. At higher production rates, there will necessarily be higher pressures in the die and it is anticipated that these will be sufficient to generate the required internal pressure to ensure good penetration of the polymer, so that the comb can be omitted, as shown.

Downstream, in the combining zone 28b there is a single rectangular section duct 56. Thus, as shown in FIG. 11, the cables 50 as they leave the tubes 48 are sandwiched between top and bottom flows of polymer, and continue to travel together down the duct 56.

It is to be appreciated that this arrangement with the polymer brought up against the cables from two sides can be advantageous. It ensures that the cables will be positioned accurately and consistently in the finished product and that they will not be displaced by any cross flow of the polymer. This arrangement also enables other forms of stretch inhibitor to be used. For example, a steel tape or tape comprising steel cables embedded in a polymer could be used. Where any tape (and a carbon fiber tape 174 is shown in FIG. 8b) is used, it is important that the polymer is supplied from both sides, to ensure accurate formation of the handrail.

It is also possible for the steel cables to be formed into a composite tape, having a sandwich construction, in which the steel cables are embedded between two layers of polymer, and on either side there are two layers of fabric to complete the sandwich. Such composite tape can be formed using an apparatus similar to apparatus described herein. Thus, steel cables can be fed into a die and polymer can be supplied above and below the cables. Separately, and after embedding of the cables in a composite polymer flow, two tapes of the required fabric are brought into the die through slots, as for the slider fabric 62. Moreover, such arrangement could be incorporated as an additional stage of the die assembly 22. In effect, the composite tape would be formed continuously, upstream of the cable combining zone 28, and fed into that zone. An advantage of this technique is that it would enable a different grade of polyurethane or other polymer to be present in the composite sandwich and immediately around the cables. Such a construction is shown in FIG. 8c, where the additional tapes or fabric layers are identified at 190 and the additional polymer layer at 188.

A known problem in handrail construction is fretting of the cables. In certain handrail drives, such as linear drives, the portion of the body of the handrail bearing the cables is subject to extreme pinching loads as it passes through pairs of drive rollers. This can cause fretting of cables and separation of the cables from the surrounding polymer. Other types of drives impart different loads. By separately embedding the cables in a composite tape and by selecting a polymer of a suitable grade, one can tailor the characteristics of the handrail. It has been observed that use of a high pressure comb in combination with a semi flexible adhesive works well to penetrate the wires in each cable, and protect each cable to prevent or at least reduce fretting.

With reference to FIGS. 1 and 11, a reel 60 for slider fabric is mounted on a shaft (not shown). The shaft would be connected to a drive mechanism for maintaining a desired tension in the slider fabric. The slider fabric 62 leaves the reel 60 as a flat band. This slider fabric 62 enters the upstream combining zone 28a by an entrance slot 64. The slot 64 has a corner 64a which turns the fabric band through approximately 70°, and a further corner 64b, after which the slider band extends horizontally. The corner 64a, 64b can be coated with TEFLON™ or otherwise configured to reduce friction. Excessive friction tends to stretch the slider fabric, resulting in pretensioning of it. This can make it difficult for a resulting handrail to bend backwards, when passing through a drive mechanism. After the corner 64, the slider fabric 62 is brought up against the bottom of the composite extrudate 58 and combined with it.

The slider fabric 62 is typically an elongate flexible web of sheet material having a generally constant width. A relatively low coefficient of friction of the slider fabric 62 enables the handrail to slide over guides. The width of the slider fabric 62 depends on the size of the handrail, and can be 125 to 60 mm wide, for example. In some examples, the slider fabric 62 can consist of woven material, either a natural material like cotton or a synthetic material such as polyester or nylon. However, it should be appreciated that the term "fabric" as used herein contemplates other nonwoven sheet materials that have suitable properties.

It has been determined that the bending modulus of an extrudate product based on a combination of thermoplastic elastomers and woven fabric can be strongly dependent on the properties of the fabric. This is particularly the case in a handrail where the neutral bending axis is defined by a high modulus member (e.g., a cable array) of significant distance from the fabric. The fabric can be subjected to a longitudinal pulling force in a crosshead extrusion process, which can cause the fabric to distort and stretch. This stretch is a function of the fabric properties, applied force and temperature. In a crosshead extrusion die, the temperature of the die and molten polymer can be of a level that will weaken a synthetic woven fabric, and this can result in significant stretch even at relatively low loads. Once the fabric is stretched and cooled the properties are changed and locked in to the new product, which can have adverse effects on the properties of the product. The fabric that has experienced significant process stretch will generally have a higher modulus and lower elongation to break than the fabric prior to processing.

The slider fabric 62 can be preshrunk. If it is not preshrunk, it has been found that it can give limited performance in tension, especially where the handrail is to be bent backwards in a drive mechanism; preshrunk fabric generally enables greater stretching of the fabric in tension. Preshrinking can be provided by passing the fabric 62 between heated plates, immediately before it enters the die assembly 22. Furthermore, it has been found that preheating promotes adhesion of the fabric to the thermoplastic material.

An example of a method and apparatus for slider layer pretreatment is disclosed in U.S. Provisional Patent Application No. 60/971,156, filed on 10 Sep. 2007 and entitled "Method And Apparatus For Pretreatment Of A Slider Layer For Extruded Composite Handrails", and the corresponding PCT Application WO/2009/033273 filed on 10 Sep. 2008, the entire contents of both are incorporated herein by reference.

As shown in FIG. 4, the composite extrudate 58 initially extends across the full width of the slider 62. In the combining zone 30, (FIG. 11) the edges of the slider 62 are folded upwards, so as to extend up the sides of the extrudate, which is shown as a rectangular cross-section. The effect of this is to reduce the width of the extruded section or combined extrusion flow 58 (FIG. 4), and its depth increases correspondingly, so as to maintain a constant cross-section.

Figure 13:
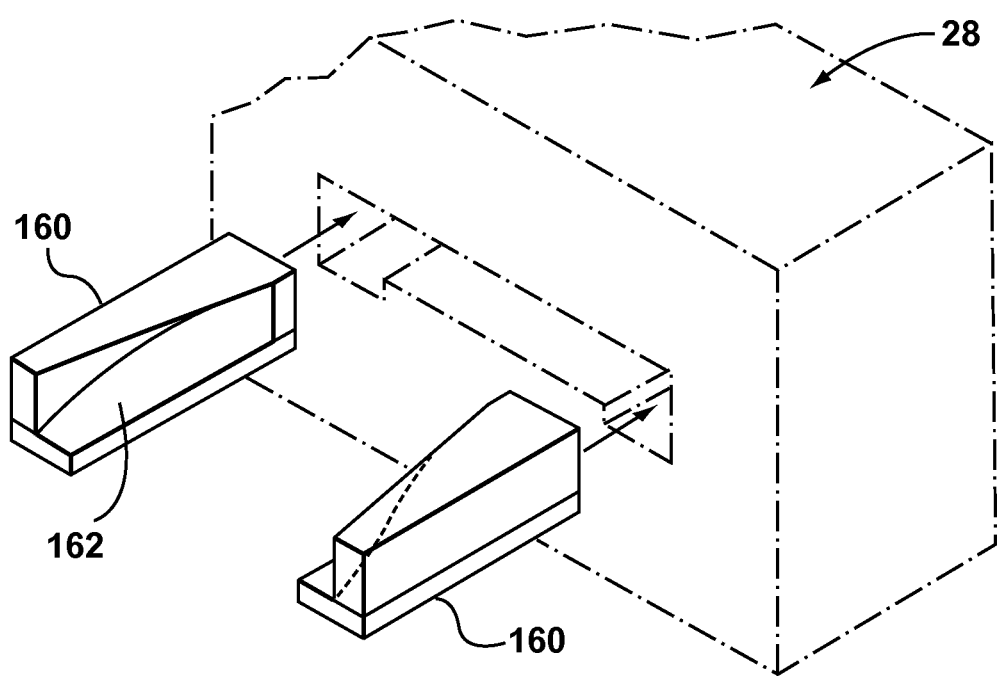
FIG. 13 is a perspective of an element of the die assembly.

FIG. 13 shows die inserts 160, which are mirror images of one another, and a part of the slider combining zone 28. The die inserts 160 serve to turn up edges 63 (shown in FIG. 5) of the slider fabric. Each die insert 160 has a ramp surface 162, which is shown as flat or horizontal at one end and progressively rotates through to a vertical position at the other end of the insert, to effect the turning up of the edge.

As indicated schematically in FIG. 11 at 164, it is also possible to insert a breaker ply or additional ply into the handrail section. In effect, an additional ply of fabric is introduced between composite extrudate 58 and a secondary flow from the inlet 70. Thus, as indicated in FIG. 11, a slot similar to the slot 64 can be provided between the slider combining zone and the outlet zone. It will be further appreciated that this basic technique of providing two flows of the polymer or polyurethane separately on either side of the fabric can be applied in various ways. For example, an additional ply need not necessarily be applied between the two flows from the first and second inlets. It is possible, for example, for part of the flow from either one of those inlets to be branched off, to effect a sandwiching of an additional ply between that branched flow and the main flow.

The secondary inlet 70, as for the other inlet can be connected to a conventional screw extruder, and again any suitable extrusion machine can be used, optionally in combination with a melt pump. The inlet 70 continues through a duct 72 into the outlet zone or block 32. The duct 72 is connected to a standard manifold 74, known as a coat-hanger shaped manifold, which distributes the flow substantially uniformly across the width of the composite extrudate or extrusion flow 58. The manifold 74, in section, shows two channels extending down either side of it and a relatively narrow section between the two channels, which section increases in width from top to bottom.

Figure 9:
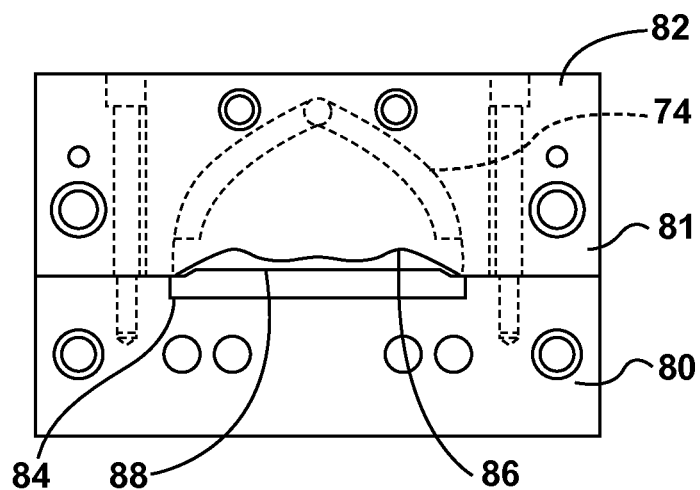
FIG. 9 shows a view looking back towards the die exit.

FIG. 9 shows an end view of the die looking upstream. As shown, the outlet zone 32 has a lower die member 80 and an upper die member 81 secured together by bolts in bores 82, in known manner. The coat-hanger shaped manifold 74 is indicated in dotted outline.

The lower die member 80 defines a rectangular channel 84 in which the fabric slider 62 is received with the composite extrudate. To accommodate the additional material from the second inlet 70 and to form the required handrail profile, the upper die member 81 can define a double-peaked curved profile 86.

The profile of the duct for the composite extrudate 58 (FIG. 4) upstream of the manifold 74 is indicated by the line 88 (FIGS. 7 and 9). The shape of this line 88 will depend upon the form of the handrail being extruded. In this example, the inlet 70 and the extrusion machine associated with it had a relatively small capacity, and hence the cross-section that could be filled from the inlet 70, i.e. the cross section between the line 88 and profile 86, was restricted.

For smaller handrail sizes, the line 88 would be a straight line, so that the composite extrudate 58, upstream in the manifold 74, would be a simple rectangle, as indicated in FIG. 7. As shown in FIG. 9, for larger handrail sizes, the line 88 would include a trapezoidal centre section; in other words, the extrudate 58 would be caused to adopt the profile of a rectangle with a super imposed trapezium. This occurs when the sides of the slider fabric 62 are folded up. This has the effect of reducing the effective cross-section to be filled from the inlet 70. As shown, the arrangement is such that the secondary material from the inlet 70 always extends to the edge of the cross-section. It is intended that only the secondary flow be coloured as desired, as this forms the exterior of the handrail, and the primary flow can be clear or uncoloured. It will be appreciated that any combination of colouring and clear material can be used for the two flows. For example, where an additional ply 164 is provided, the first flow could be coloured and the second flow clear, to enable a pattern on the additional ply to be visible. The addition of the secondary flow is indicated schematically by the arrows 90 in FIG. 4.

Figure 14:
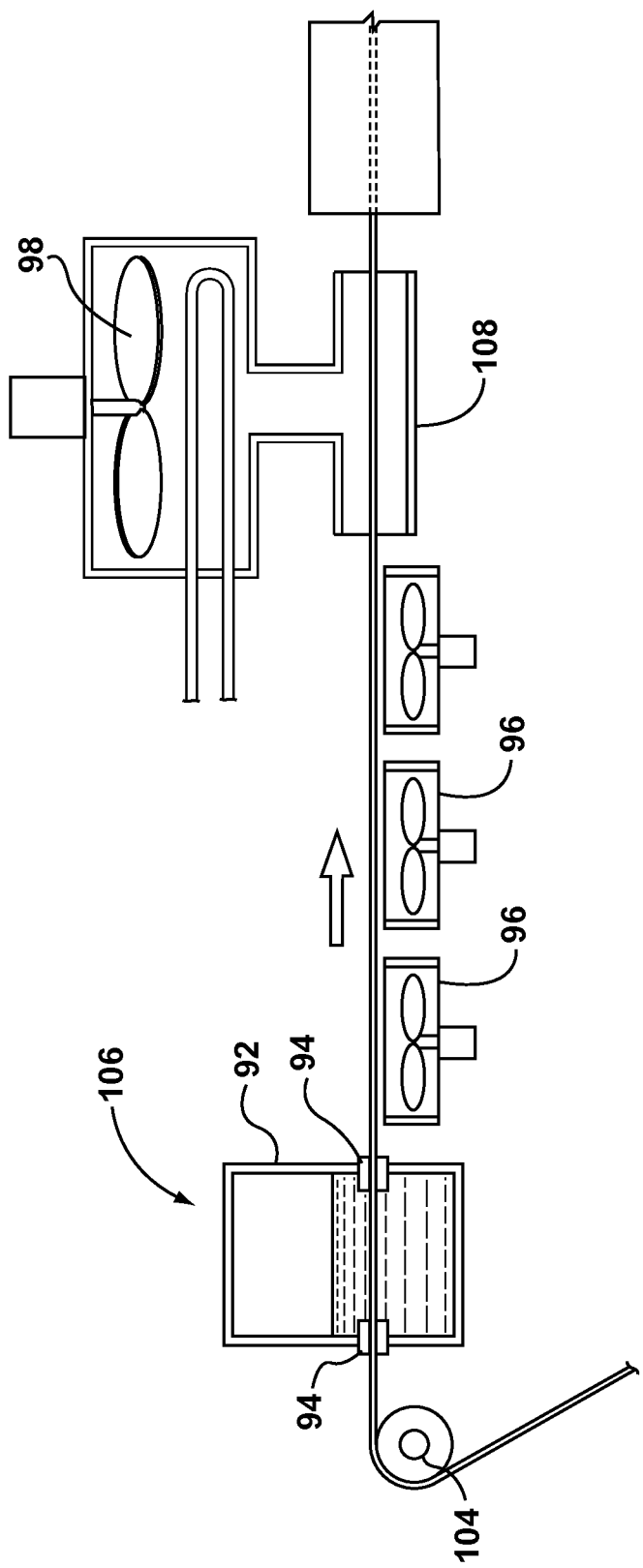
FIG. 14 is a side view of part of a cable supply unit, showing application of an adhesive, drying and preheating.
Figures 15A, 15B, 15C:
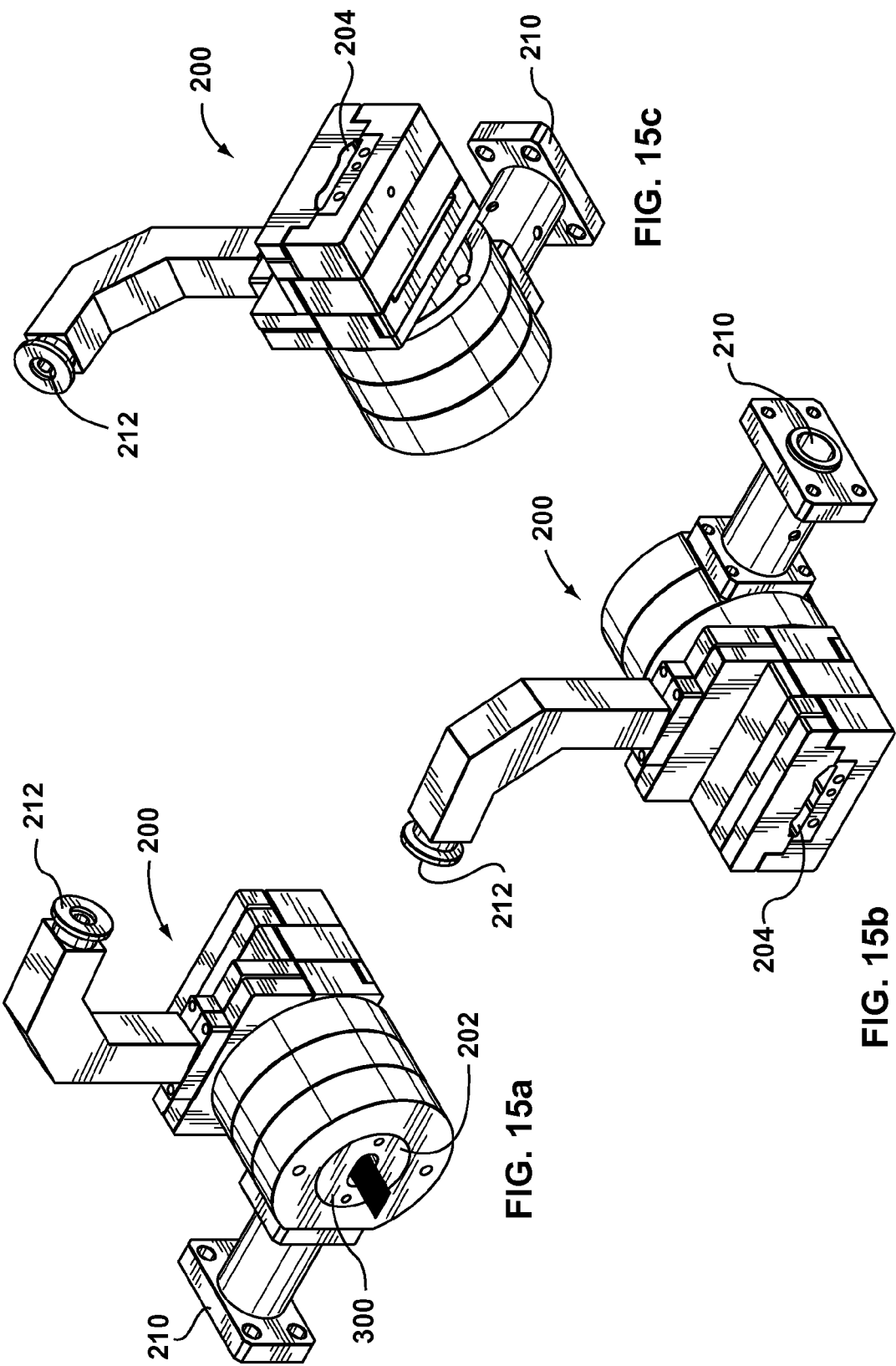
FIG. 15a is a perspective view from above and the rear of a die assembly.
FIG. 15b is a perspective view from above and the front of the die assembly.
FIG. 15c is a perspective view from below of the die assembly.

The cable supply unit 100 is now described in relation to FIGS. 1 and 14. There is provided a plurality of cable reels 102 each containing a single, multi-strand steel cable, which can be of a type suitable for handrails. The cable reels 100 can be mounted on shafts (not shown) including a means for braking, which maintain an appropriate tension in the cables. Optionally, the cable reels 100 can be housed in a temperature and humidity controlled enclosure to prevent corrosion of the cables prior to adhesive application. The cables 50 can pass around a turnaround roller 104 and then pass through an adhesive applicator 106, although the turnaround roller 104 is optional.

It should be appreciated that handrails can generally shrink over time, which is due to the individual strands of the steel cables rubbing and wearing. The detritus, which can be primarily steel, fills the interstices of the cable. Oxidation of the iron causes this material to grow which forces the cable to expand in cross-section and decrease in length. Completely impregnating the cable with adhesive, with its excellent abrasion resistance, can prevent or at least reduce this effect.

The adhesive applicator 106 comprises a vessel 92 for holding a liquid adhesive solution. It has an inlet and an outlet 94, each of which has hard fibrous or sponge pads between which the cables 50 pass and which are saturated with adhesive solution to promote penetration of the adhesive into the interior of the cables. The pads also serve to seal the vessel 92. To provide a substantial adhesive coating, the applicator 106 can include tubes, at the outlet side, through which the cables 50 pass, the tubes being sized to provide the desired thickness of adhesive. The adhesive applicator 106 can also serve to apply tension to the cables. Before entering the die assembly 22, the cables pass over fans 96, which drive off the solvent, to leave the adhesive on the cables. The cables 50 then pass through a hot air tunnel 108 connected to a fan with a heater 98 or other hot air source. This serves to preheat the coated cables 50 to a temperature of around 300° F., or such other temperature as promotes good adhesion of adhesive. Infrared panels or other heating devices could alternatively be provided. For clarity, the cables are shown spread apart as they pass around the roller 104; however, the cables can be substantially parallel and uniformly spaced as they pass through the adhesive applicator 106 over fans 96 and through tunnel 108.

Now, the section extruded out of the die assembly 22 is shown in FIG. 7 and comprises an intermediate extrudate 110. The temperature conditions in the die are such that, on leaving the die, the polymer is still molten, i.e. it is generally above a crossover temperature. Below the crossover temperature, the shear modulus is greater than the loss modulus of the material, while above the crossover temperature the loss modulus is greater than the shear modulus. The shear modulus is the elastic-response component associated with the tendency of the material to remember its predeformation dimensions, while the loss modulus is the energy-dissipative response component and is associated with flow during deformation (see "Thermoforming Thermoplastic Polyurethanes", by Eckstein et al., Plastics Engineering, May 1995, page 29). The temperature is such that the polymer is still liquid but has a high viscosity. The polymer is thus largely stable in that it will maintain the twin-peak rounded profile for some period of time, and will not rapidly slump to a flat profile. At the same time, it has the characteristic of a liquid, in that, as detailed below, it can be shaped and formed to alter the profile of the cross-section while not having a tendency to return to its pre-formed shape. More particularly, relatively sharp angular features can be formed without difficulty.

There are at least two characteristics of a handrail that enables such an extrusion technique to be adopted. Firstly, the handrail includes the slider 62. During passage along the mandrel 112, the slider 62 effectively acts as a conveyor belt to support the still molten TPU. At this stage, the TPU is extremely sticky, so that if it comes into contact with any solid surface, it tends to stick to it; in other words, it cannot be permitted to come in direct contact with the mandrel 112. Indeed, if any shaping roller or the like has to contact the TPU, then this must be cooled, so that the TPU, at least locally, is "skinned" to prevent sticking.

A second characteristic is that the handrail has a simple, rounded external shape. This shape can be readily formed on the mandrel. In contrast, an external surface with a complex shape with protruding portions, recesses and sharp corners could not be formed by such a technique but rather would need to be formed by an appropriately shaped die.

Figure 10:
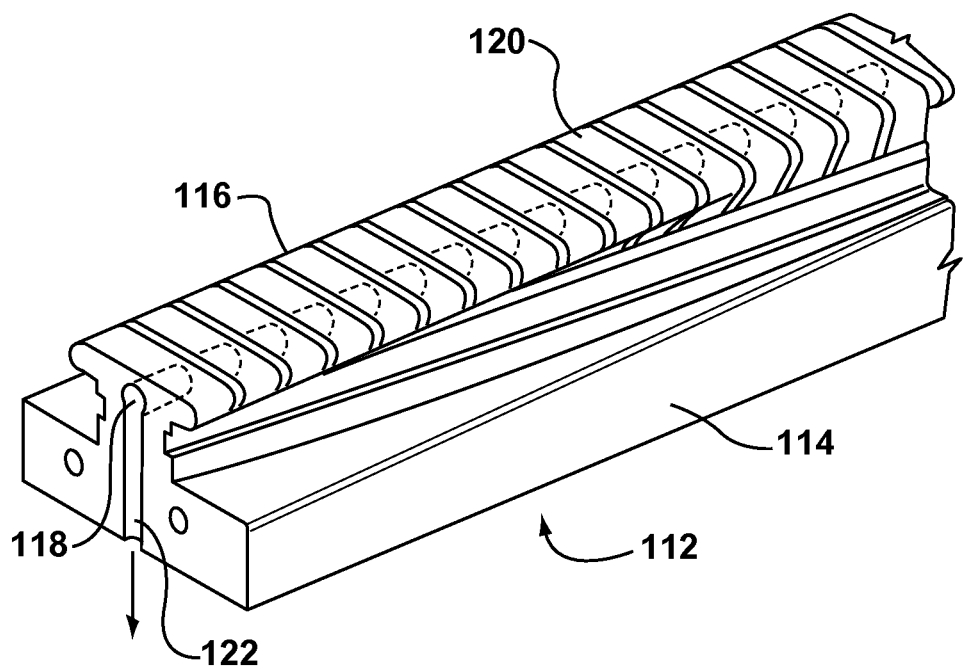
FIG. 10 is a perspective view showing part of a forming mandrel for forming the internal profile of the handrail.

To shape the intermediate extrudate 110 into the final profile of the handrail 126, an elongate primary mandrel 112 is provided. The mandrel 112 comprises a number of sections. As FIG. 10 shows, the mandrel has a base 114 and an upper section 116 defining a support surface. The profile of the upper section 116 changes progressively and smoothly, to form the handrail profile. Extending longitudinally of the upper section 116 is a bore 118 into which opens slots 120. A transverse port 122 opens into the bore 118. The port 122 is connected to a vacuum source. This maintains a vacuum within the bore 118 in the range of 8 to 12 inches of mercury. The purpose of the vacuum is to ensure that the slider fabric 62, and hence the extruded section, always closely follows the mandrel 112. The level of the vacuum is determined by that necessary to ensure good accurate following of the mandrel 112 profile, while at the same time not being too high so as to create excessive drag. If a high degree of vacuum is used, then a higher tension has to be applied to pull the handrail along the mandrel, and this can stretch the slider fabric 62.

FIGS. 5 and 6 show progression of the profile. As shown in FIG. 5, the edges of the extruded profile are first dropped downwards, so as to have the effect of lessening the twin peaks of the original profile in FIG. 7. Note that the slider edges, indicated at 63 in FIG. 5 are up against side portions of the mandrel 112. In FIG. 5, the modified intermediate extrudate profile is indicated at 110a. These sides edges 63 are continuously supported along the mandrel 112. The sides of the profile 110a are progressively dropped down, to form part of the rounded ends of the C-shaped profile of the handrail, until they are vertical. They then continue to be turned inwards and upwards, to form the final C-shaped profile of the handrail, as shown in FIG. 6. The exact length of the mandrel 112 will depend upon the intended production rate.

The mandrel 112 can be heated or cooled in order to maintain the extrudate at the ideal forming temperature. This can be done since the fabric web, which remains solid through-out the process, forms the contact surface and the molten material is untouched and hence cannot stick to the material. Depending on the production speeds at which the extrudate travels across the mandrel 223, cooling may in fact be necessary to maintain the mandrel at an appropriate tool temperature, for example, 50° C.

Figure 8A:
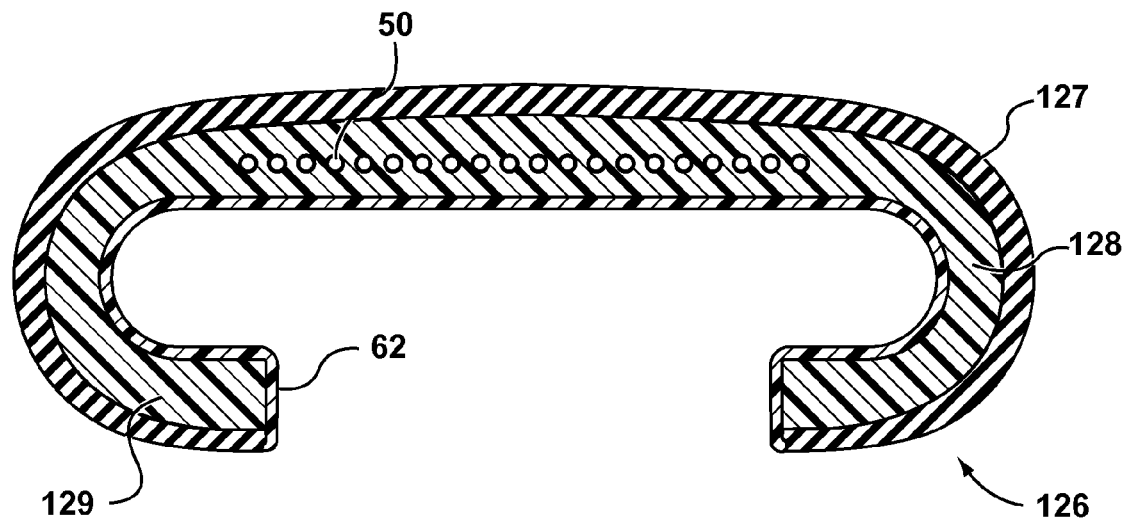
FIGS. 8a to 8e show cross-sections through different finished handrail profiles.
Figure 8B:
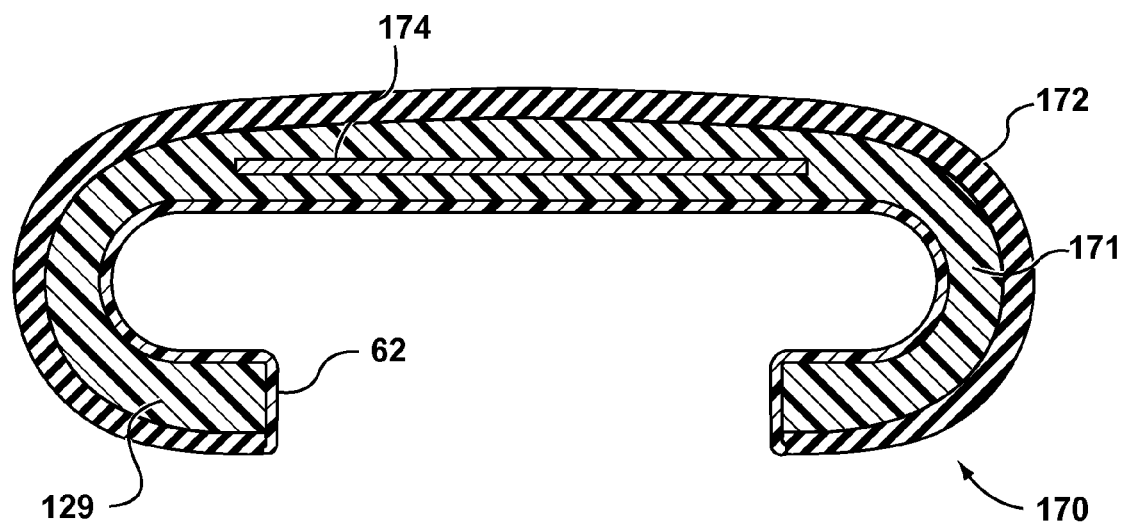
Figure 8C:
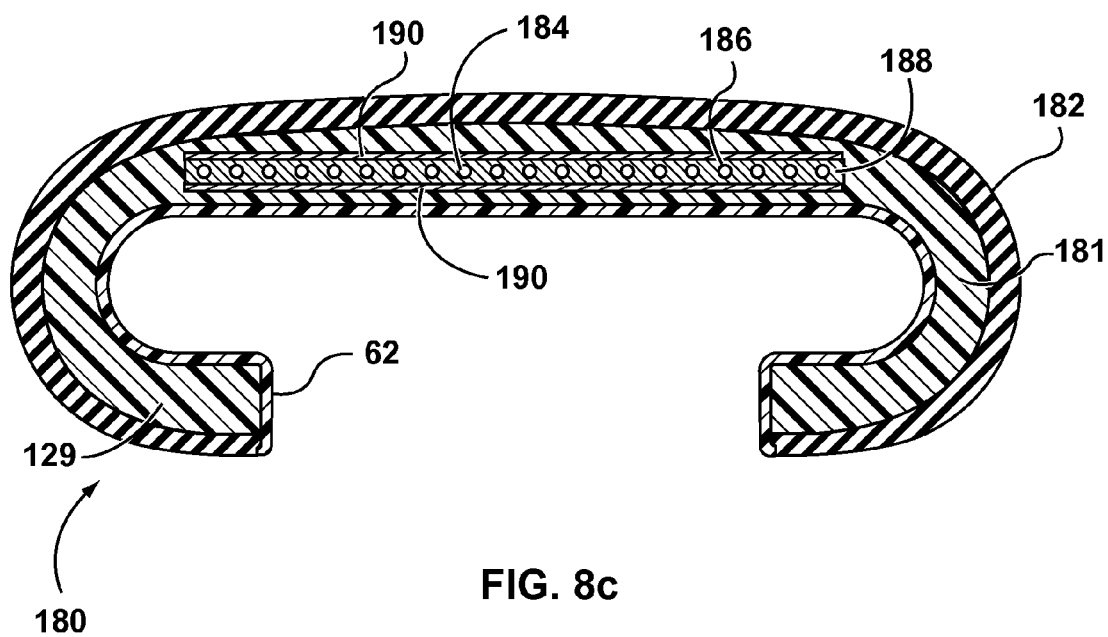

At the end of the mandrel 112 the finished handrail profile 126 is formed, this handrail profile being shown in FIGS. 6 and 8a. As noted, the material is maintained in a molten state along the mandrel. As is known, thermoplastic elastomers and specifically thermoplastic polyurethane do not have defined melting points. Rather, the material has a shear modulus, which is the elastic-response component associated with the tendency of the material to behave elastically and remember its predeformation dimensions, and also a loss modulus which is the energy-dissipative-response component and which is associated with flow during deformation. The ratio between these two factors or moduli, sometimes expressed as tan δ (delta), is indicative of the state of the material. When tan δ is much less than 1, then the material behaves as a solid and when tan δ is greater than 1 the material behaves as a viscous fluid. These two moduli change progressively over a significant temperature; for example a polyurethane with a molecular weight of 152,000 shows a progressive decrease in the value of both moduli over a range from about 150° C. to over 200° C., with the shear modulus decreasing more rapidly than the loss modulus. Consequently, at a temperature of around 165° C., the value tan δ exceeded 1, indicating that the viscous properties were then dominant. In general, the material should have tan δ exceeding 1 along the whole length of the mandrel. For some applications it may be acceptable to have the material slightly below this point for at least part of the length of the mandrel. Also, due to heat loss from the exterior, the temperature of the outside of the handrail will be less than the temperature on the inside and it is the internal temperature around the T-shape slot that is critical as that is where relatively complex changes in the profile occur. The outer layers are merely subject to relatively gently curving. Hence, it is acceptable if the outside begins to "skin" slightly, i.e. it starts to solidify. However, at the end of the mandrel 112, the polymer is still not properly solidified. The original twin-peaked profile of the intermediate extrudate, in FIG. 7 is selected so that at the other end of the mandrel 112, the desired final profile is obtained.

Accordingly, to cool and solidify the polymer, it is now passed into a cooling unit 130 including a cooling trough 132 (FIG. 2a). As indicated in FIG. 1, the tank 132 includes a secondary mandrel 134. This secondary mandrel has a profile of the finished handrail 126. At least the first part of this mandrel is slotted and has a bore, as for the mandrel 112, and is also connected to the vacuum source. In this example, the cooling tank 132 is 12 feet long, and the mandrel 134 has a corresponding length; the exact length will depend upon the production rate. The first 3 feet of the mandrel 134 in the tank 132 are slotted and connected to the vacuum source. The reason for this is to ensure that the handrail closely follows the mandrel 134, until it has been cooled sufficiently so as to be fully stable and at least partially solidified, so as to retain its shape.

Figure 2B:
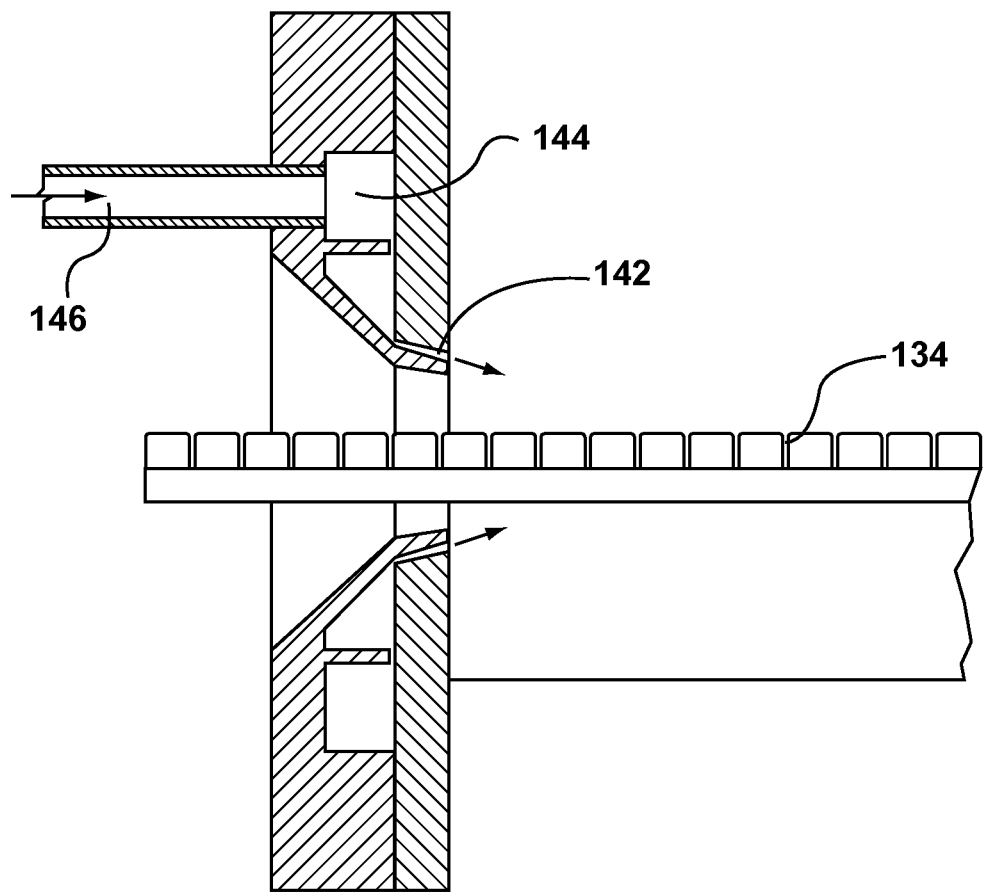
FIG. 2b is a vertical sectional view of one end of the cooling tank showing a water curtain.

As shown, the tank 134 is provided with a spray bar 136 having an inlet 138 and a plurality of spray nozzles 140. In some examples, referring to FIGS. 2a and 2b, at the entrance to the tank 134 a slot-shaped nozzle 142 can be provide a water knife or curtain. This can enable immediate and uniform skinning of the extrudate, in case the extrudate is not skinned at this point. If it is still not skinned and is subject to a spray, the individual droplets tend to mark the surface. By applying a uniform curtain or knife of water, this problem is avoided and a skin of generally solid material is formed. Once this skin is formed, the handrail can be readily cooled with a random spray without affecting the external appearance. The nozzle 142 can direct a curtain of water inwardly at a slight angle to the handrail, so as not to mark it. A supply chamber 144 in a generally circular element has an inlet 146 for water, for the curtain 146.

Instead of a water knife, a water source such as a single nozzle (not shown) can be used to wet with cooling water the first, upstream roller 148. A plurality of rollers 148 can be implemented to cool and effect the skinning of the exterior of the extrudate and the removal of die lines. The rollers 148 are driven by the extrudate. Water applied to the extrudate by the first, upstream roller 148 can collect on the extrudate surface between the first upstream roller 148 and the second, downstream roller 148. The second, downstream roller 148 can also be used to shape the outside surface of the handrail.

In use, water is sprayed through the spray nozzles 140 to cool the handrail 126. The tank 132 includes a drain for the water, which is either discharged, or passed through a cooling unit for return back to the inlet 138. Water from the spray nozzles 140 can cool the handrail 126, so as to solidify the polymer. This has been found to improve the lip strength of the handrail 126. While the reasons for this are not fully understood, one possible explanation is given below.

As the handrail 126 is cooled, the outside will solidify at first, and as is known, during solidification, the material will shrink or become more dense. Thus, initially, there will be an outer layer that is solidified, and the interior will still be molten. Note that, in some examples, the mandrel 134 itself need not be cooled. When the interior of the handrail 126 cools and solidifies, it will in turn attempt to shrink or become more dense. This is believed to have the effect of prestressing the handrail, so that the lips, indicated at 129, in FIGS. 8a, 8b and 8c, are urged towards one another. It is further believed that the handrail profile is maintained by the slider fabric 62. In any event, for a given hardness of material, it has been found that improved lip strength can be obtained.

It also has been found that the amount of heat removed from the extrudate can be important, and the timing of the removal of this heat. It has been found that for effective prestressing, heat can be removed predominantly from the outside of the handrail and that this heat removal should take place before the remaining heat is removed from the handrail. Sufficient heat can be removed, to solidify a substantial layer around the outside of the handrail, so that subsequent cooling, and hence shrinking, of the interior effects prestressing. Provided this amount of heat is removed from the exterior first, the outer layers of the handrail can be sufficiently cooled and solidified that, when the inner part of the handrail solidifies, the prestressing occurs. Here, the arrangement with the water spray will remove heat almost exclusively from the exterior; there may be some minor amount of heat removed from the interior, but this is purely incidental. In the example illustrated, no attempt is made to remove heat through the mandrel 134 (FIG. 2a), but on the other hand, no steps are taken to specifically insulate the mandrel 134 to prevent such heat loss. However, as mentioned above, the cooling may be necessary to maintain suitable tool temperatures while operating at full speed.

Commonly, it is required for handrails to have a lip strength, and in accordance with standard tests, in excess of 10 kg, this being to displace the lips apart by a prescribed amount. Here, it has been found that, if the handrail is allowed to cool naturally and evenly from both the interior and the exterior, the lips can be too weak to meet this test; on the other hand, with the prestressing effected by this cooling technique, a lip strength greater than 10 kg and in the range 10 to 20 kg can be achieved, which is comparable to conventional handrails.

The lip opening force of the handrail extruded by the method and apparatus disclosed herein can be typically 15 kg, and can be at least than 10 kg for a 7 mm deflection when measured with 30 mm jaws, for a thermoplastic polyurethane of a hardness 85 Shore 'A'. This is compared to approximately 6 kg for a homogeneous non-prestressed sample, fabricated by compression molding with even heating and cooling.

On leaving the tank 132, the handrail 126 passes through a drive unit 150. The drive unit 150 includes upper and lower drive assemblies 151 and 152, each of which includes a band mounted on rollers, which bands engage the handrail 126. The lower drive assembly 152 can be configured to engage the slider on the inside of the handrail. Such units are conventional for extrusion molding. Here, the drive unit has a DC motor with tachometer feedback, so as to give accurate control on the speed of the handrail. In some examples, this can give speed control accurate to within 0.1%.

As is known in the extrusion art, if the extrusion speed is controlled carefully, and the flow rates through the two inlets 34, 70 are also controlled carefully, then the profile of the extruded handrail 126 and its weight per unit ft can be constant within desired tolerances. With good control, a weight tolerance better than 1% per unit length can be achieved. The extrusion machines are operated with a constant screw speed to provide the necessary constant flow rate, which will be achieved if other factors, e.g., temperature, pressure, etc., are constant. Use of melt pumps can further improve control and surge reduction.

As indicated at 155, a spool is provided for taking up the finished handrail 126. To form a loop of handrail, a selected length of handrail can be spliced, for example, as disclosed in the applicant's U.S. Pat. No. 6,086,806, entitled "Method Of Splicing Thermoplastic Articles", the entire contents of which are incorporated herein by reference.

FIG. 8a shows the final finished profile of the handrail 126, with the cables 50 and slider fabric 62. The thermoplastic elastomer is formed as two layers, an inner layer 128 being the thermoplastic supplied through the first inlet 34 and an outer layer 127 being the thermoplastic supplied through the second inlet 70. The cables 50 can be disposed in the inner layer 128 in a coplanar arrangement, the cables 50 defining the neutral bending axis for the construction 126.

Now, with regard to exemplary materials, the slider fabric 62 can be plain weave spun polyester with a weight of 20 ounces per square yard.

Cables can be selected to have a relatively open construction to allow the adhesive to penetrate the wire. For example, suitable steel cables can each comprise a core of three strands of 0.20+/−0.01 mm, and 6 outer strands of 0.36+/−0.01 mm. High tensile steel cord, brass plated, with suitable specifications can be obtained from Bekaert SA, of Kortrijk, Belgium.

The adhesive used can be a solvent-based adhesive, although any suitable adhesive, for example a reactive hot-melt adhesive could be used. The adhesive applied to the cables can be, for example but not limited to, THIXON™ 405 supplied by Morton Automotive Adhesives, a division of Morton International Inc.

As to the thermoplastic elastomer, both layers 127 and 128 can be of Lubrizol ESTANE™ 58206 having an 85 Shore 'A' hardness. For certain applications, it may be desirable to form the outside of the handrail with a harder thermoplastic, and for this purpose, Lubrizol ESTANE™ 58277 with a 45 Shore D' hardness can be used; the inner layer 126 could then be a softer material, such as Lubrizol ESTANE™ 58661 with a 72 Shore 'A' hardness. For external applications, where the handrail may be exposed to rain and the like, a polyether type water-proof thermoplastic can be used for the outer layer 127, such as Lubrizol ESTANE™ 58300, which has a hardness of 85 Shore 'A'. Lubrizol ESTANE™ 58226 may also be suitable for some applications. Other thermoplastic materials are possible.

FIGS. 8b and 8c show variants of the handrail section. In FIG. 8b, second handrail section 170 includes the slider 62 and inner and outer layers 171 and 172 of thermoplastic. Here, the individual cables 50 are replaced by a carbon fiber tape 174.

In a third variant of the handrail indicated at 180 in FIG. 8c, the slider 62 is again present as before. The handrail 180 has an inner layer 181 and an outer layer 182. Here, the stretch inhibitor is provided by a matrix 184, which comprises cables 186 embedded in a layer of thermoplastic elastomer 188. On either side of the elastomer 188 there are fabric plys 190, to form a sandwich construction. As discussed above, this sandwich construction can be formed at an entrance part of the die assembly, as an integral part of the die assembly, as an integral part of the whole handrail forming process.

Figure 8D:
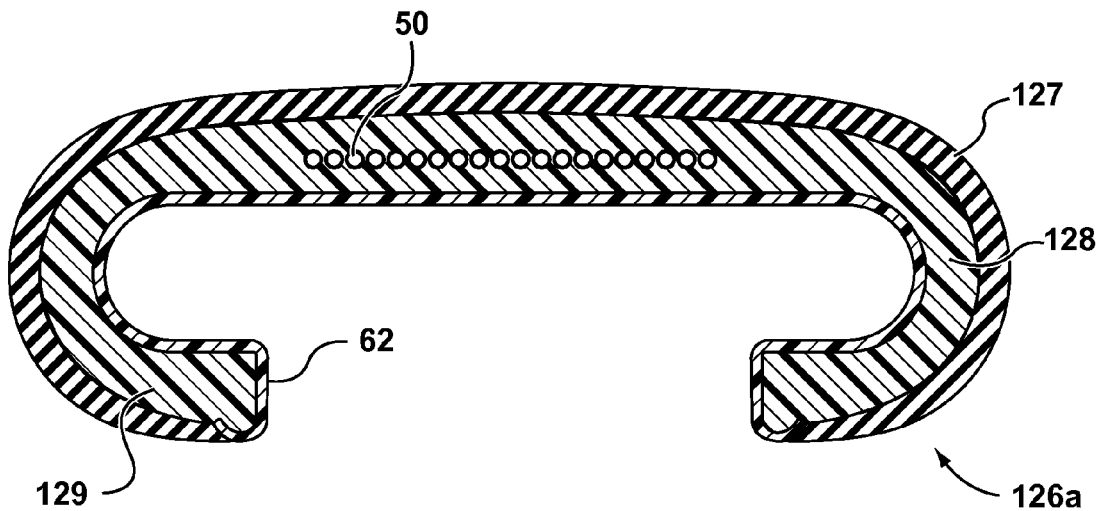
Figure 8E:
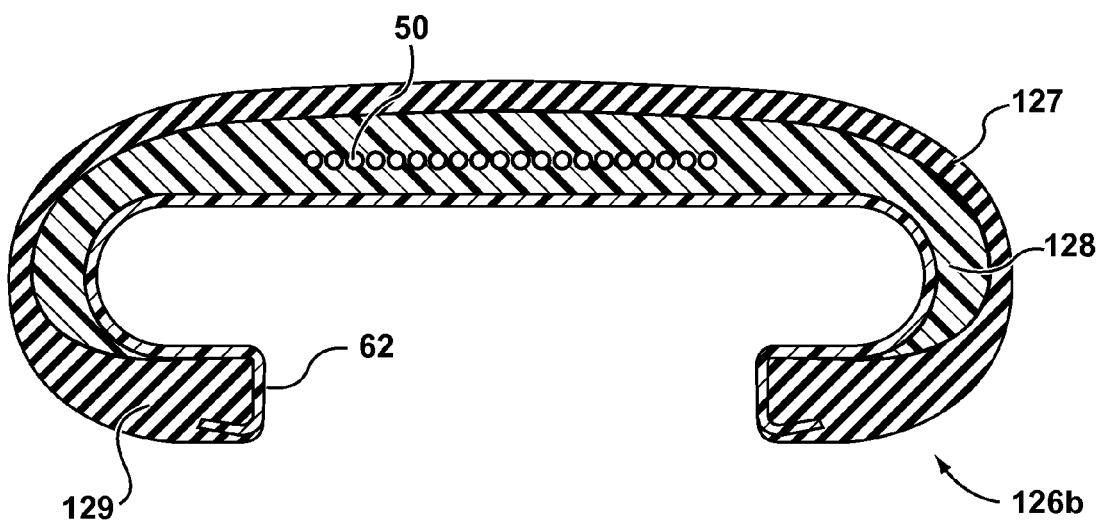

Modified handrail profiles 126a, 126b are shown in FIGS. 8d and 8e. In comparison to handrail 126, handrails 126a, 126b may exhibit less cable buckling under severe flexing conditions, reduced strain and bending stresses and increased fatigue failure life under cyclic loading conditions, as described in the applicant's U.S. Provisional Patent Application No. 60/971,163, filed on 10 Sep. 2007 and entitled "Modified Handrail", and the corresponding PCT Application WO/2009/033272 filed on 10 Sep. 2008, the entire contents of both are incorporated herein by reference.

The profile of the curve 86 can be chosen so that, after travel along the mandrel 112, the desired profile is obtained. It will be appreciated that this profile will not always be accurate. To allow for this, one or more trimming or sizing rollers can be provided, as indicated at 147 and 148 in FIG. 2d. Thus, at least one set of rollers 147 can be provided to ensure that the overall width is within certain tolerances. At least one roller 148 can be provided to ensure that the top thickness is within a desired tolerance. Contacting the handrail with rollers is acceptable at this point, since it is cooled sufficiently to have an external skin, and the rollers will not tend to stick to the material of the handrail.

In some examples, the rollers can be essentially cylindrical. However, at least the top roller 148 can have a profile corresponding to a desired profile for the top of the handrail, i.e. it would define the crowned top surface of the handrail. The variation in diameter of a roller should not be too extreme, as this will cause slipping between portions of the roller and the handrail.

To reduce friction, various components can be coated with TEFLON™, or otherwise treated, to give a low coefficient of friction. Thus, the corners 64a, 64b (FIG. 11) can be coated with TEFLON™. Similarly, the mandrel 112, and at least the first part of the secondary mandrel 134 can be coated with TEFLON™. Due to the vacuum, there can be a strong pressure pressuring the slider fabric 62 against the mandrels, which can generate a significant frictional effect.

While the teachings herein have been described primarily in relation to a handrail for an escalator or the like, it is to be appreciated that it is applicable to a variety of elongate articles of constant cross-section. More particularly, it is applicable to such articles, which have a main body formed from a thermoplastic elastomer with reinforcing or stretch inhibiting means running through it, and with some additional sheet layer of fabric or the like bonded to one side. Such a construction is often found in conveyor belts. Typically, conveyor belts will be generally of rectangular cross-section, with approximately uniform properties across the width of the conveyor belt.

Accordingly, it is not usually necessary to form a conveyor belt into any complex profile, as for a handrail. Hence, the forming process on the mandrel 112 can be omitted. The method described herein then enables a conveyor belt to be formed in which reinforcing cables or the like are accurately positioned, on a common neutral bending axis, at a desirable depth within the main body of the conveyor belt, and the belt can have a fabric layer bonded on one side. Again, such a conveyor belt can be spliced, as in the co-pending application mentioned above.

The polymeric material used could be any appropriate thermoplastic elastomer. Experiments and testing have shown that a thermoplastic polyurethane (TPU) of hardness 85 Shore 'A' is suitable for handrail manufacture. When this material is used to form the bulk of the handrail, its adhesion to the slider fabric is acceptable without the need for adhesives or glues. If the slider material is woven spun polyester fabric the adhesion to the TPU in the final product is typically 60 pounds per inch of width (p.i.w) on a 90° peel test. For example, a polyester fabric was extruded through the die with the die temperature set at 200° C., adhesion was measured at 20 to 30 pounds per inch width, whereas with the die at 215° C., adhesion was measured at 55 to 60 pounds per inch width.

For these tests, a lightweight polyester with a monofilament weft was used. Generally, monofilament materials pose greater problems in providing good adhesion. Bench tests were done, molding fabric onto TPU in a heated press. The TPU was predried at 110° C. At press temperatures of 215° C., the TPU thoroughly impregnated the fabric, but despite this the peel strength was only 20 pounds per inch width. On the other hand, preheating of the fabric to 200° C. and the TPU to 215° C. and subsequent lamination gave samples with adhesions of over 65 pounds per inch width.

Also note, as in FIG. 11, an additional ply of fabric 164 may be added for product design flexibility as it can be added in any location in the thickness of the handrail where the flow in the die is split, such as is done with the reinforcement.

It should be appreciated that this specification can provide an extrusion technique that enables the colour of a handrail, or other article, to be quickly changed, either by changing the colour of the secondary flow, or by changing an outer sheet layer, where this is provided.

It should also be appreciated that this specification can provide an extrusion process that is separated into a number of steps each of which is inherently simple, so that it is not necessary to attempt to effect numerous complex extrusion operations simultaneously. The actual extruded profile can be relatively simple, and the technique is such that all elements can be accurately located in the correct position in the extrusion profile. The slider fabric of a handrail can be used as a conveyor belt to support the extrudate during formation of the final handrail shape. The final form of the handrail shape can be formed by progressive change of what becomes the interior handrail, and without necessarily contacting the exterior profile, which enables the exterior to cool and solidify to a high gloss finish. The exterior can be cooled by spraying with a fluid, for example water, so as to pre-stress the lips, to provide adequate lip strength. Furthermore, cooling of the extrusion die components related to the slider fabric can be cooled which limits the stretch of the fabric and enables a flexible handrail product.

The teachings of this specification can enable a handrail to be produced continuously and simply, without requiring the extensive manual setting up procedures required for conventional handrails. With polyurethane used as the polymer, a grade can be selected that provides both a desirable, high gloss finish, and is resistant to cuts and abrasion, so as to maintain a high gloss finish.

The structure of the handrail can be simple unlike conventional handrails, and does not require elaborate combinations of plies to give the required strength and durability characteristics. Rather, the use of the external cooling effects prestressing of the lips, so that even with a relatively soft grade of polyurethane, adequate lip strength can be obtained.

It has also been found that by combining the slider fabric and the polyurethane together at elevated temperatures, excellent bonding characteristics can be achieved giving greater peel strength than conventional bonding techniques.

The handrail can be produced in indefinite lengths. To form a complete loop of handrail, it can be spliced together, for example, as disclosed in the applicant's U.S. Pat. No. 6,086,806. This splicing technique can provide a splice that is not detectable by an ordinary user, and which can maintain the continuous, high gloss finish and appearance of the handrail.

The provision of two separate flows to the die assembly enables different polymers to be provided. It is only necessary for the secondary flow, which forms the outer layer, to have the desired appearance and colour characteristics. The main flow can comprise any suitable material, and need not be coloured. It could include recycled material, which may come in a variety of different colours. For outdoor use, it is possible to provide the external layer with a weather resistant polyurethane, while this is not required for the main flow through the first inlet.

A further aspect of this specification is the realization that, when manufacturing a handrail, the tolerances on the T-shaped slot with a slider can be much tighter than the tolerances on the external profile. Commonly, the T-shaped slot has tolerances of 0.5 mm, whereas there may be tolerances of 1 mm on the external profile. It will be appreciated that the T-shaped slot has to follow correspondingly shaped guides, and hence tolerances can be critical. On the other hand, the exterior profile, at most, contacts drive wheels, where large tolerances can readily be accommodated. Also, at the ends of the usable top run of a handrail, the handrail will emerge from an aperture and then pass through another aperture taking it under the escalator. These apertures are dimensioned to prevent users fingers etc. from becoming trapped, but again, tolerances on the external profile for this purpose are relatively generous. Therefore utilizing hard-tooling for sizing the internal surface can be sufficient.

Reference will now be made to FIGS. 15 to 18, which show details of another example of a die assembly being generally indicated by the reference 200. The die assembly 200 has an entry or entrance for a stretch inhibitor or reinforcement, such as steel cables or steel tape, indicated at 202 and provided at the rear of the die assembly in cable mandrel 300, detailed below. At the front of the die assembly 200, there is an outlet opening 204 for the extrudate. As with the first example described above, the steel cables 50 may be supplied from the cable supply unit 100, which may be housed in a temperature and humidity controlled enclosure.

A first inlet 210 is provided for a primary polymer and a second inlet 212 is provided for a secondary polymer. As detailed below, the die assembly 200 comprises a number of separate elements that are secured together in known manner. These elements can be bolted together or otherwise secured to each other, with appropriate seals, to prevent leakage of molten polymer. FIGS. 16a to 16f detail the individual components of the die assembly 200, showing how they are built up to form the complete die assembly; additionally, the cable mandrel 300 is shown in detail in FIGS. 17a to 17e, and a comb unit 400 is shown in FIGS. 18a to 18d.

Figure 16A:
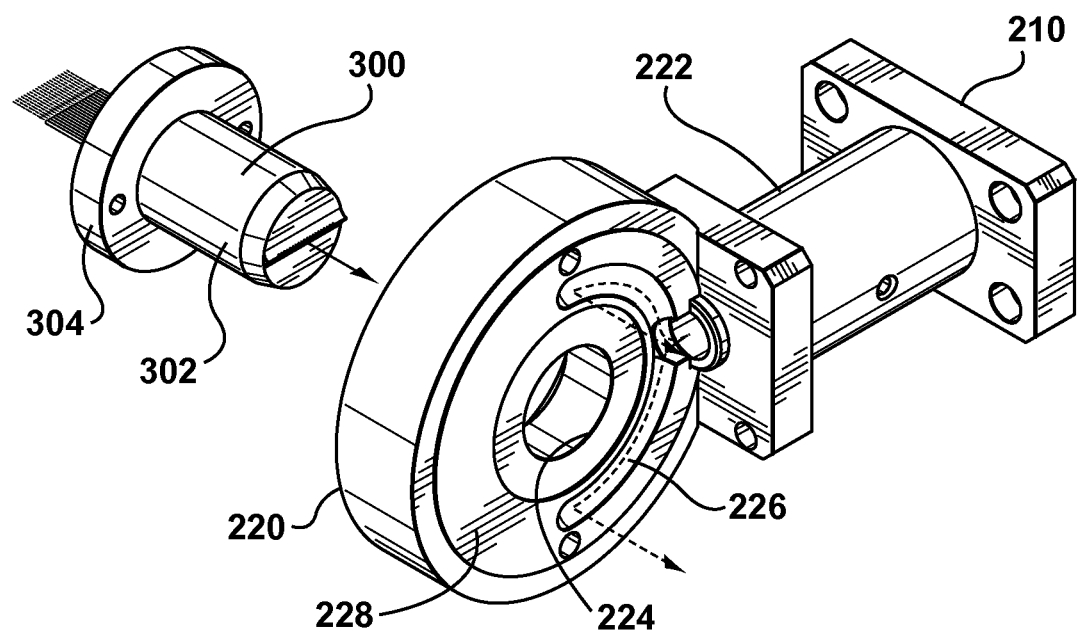
FIGS. 16a to 16f are perspective views showing progressive assembly of different components of the die assembly.

Referring first to FIG. 16a, there is shown a first runner plate 220. The first runner plate 220 is formed with an first inlet runner 222 that, in known manner, would be connected by the inlet 210 to a source of molten thermoplastic or polymer; as before, the thermoplastic or polymer will, commonly, be supplied from a screw extruder or the like. As shown, the one first runner plate 220 is generally cylindrical, and has cylindrical bore 224 for receiving the cable mandrel 300. As shown in FIG. 16a, the cable mandrel 300 has a cylindrical plug portion 302 that matches the cylindrical bore 224, and also includes a circular flange 304 for bolting the cable mandrel 300 to the first runner plate 220.

As shown in FIG. 16a, the first inlet runner 222 has a bore that opens into a semicircular channel 226 on a front face 228 of the first runner plate 220. As indicated by arrows, the channel 226 is intended to direct flow of the molten polymer in the direction of the arrows.

Figure 16B:
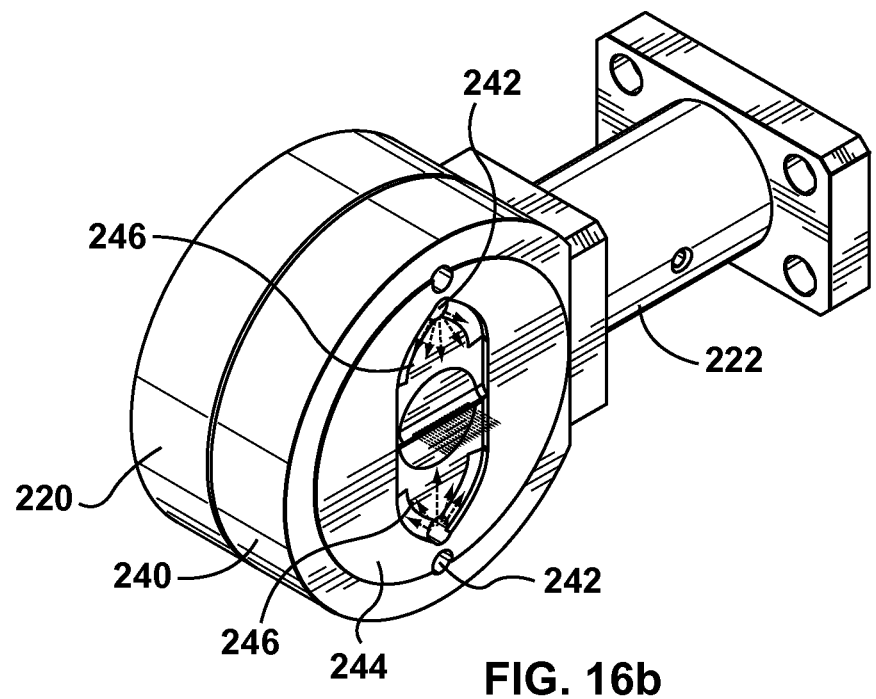

Referring to FIG. 16b, another first runner plate 240 has a rear face (not shown) corresponding to the face 228 of the first runner plate 220 and also provided with a semicircular channel to form a runner channel, which faces are mounted and sealed to one another. The other first runner plate 240 includes openings 242 that extend from that rear face to a front face 244. The front face 244 is provided with recesses 246 that form channels or manifolds directing the polymer flow towards the centre of the face 244, and thus around the reinforcement or stretch inhibiting cables, again indicated at 50.

Figure 16C:
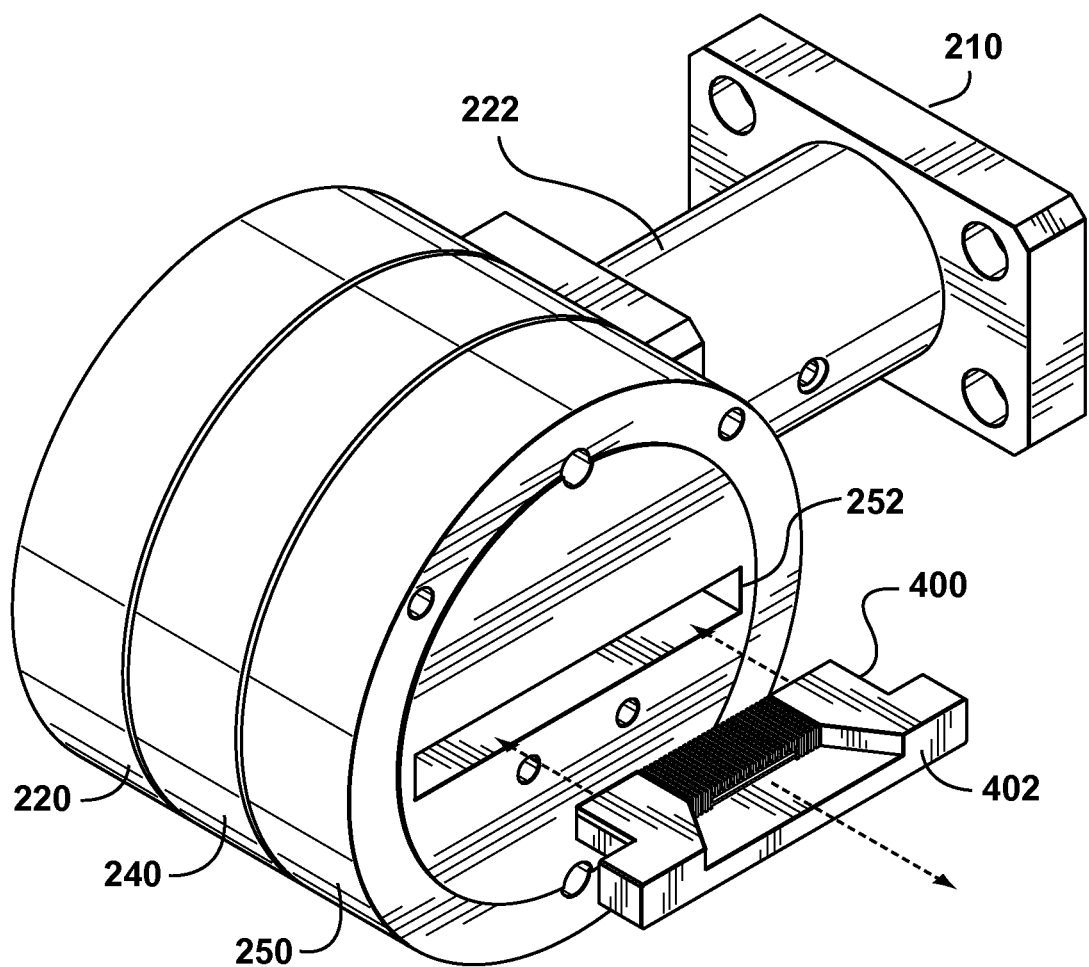

Turning to FIG. 16c, a comb plate 250 is mounted to the front face 244 of the other first runner plate 240. The comb plate 250 has an elongated rectangular slot 252, in which is mounted a comb unit 400. The slot 252 will have a profile corresponding to that for the comb unit 400 as shown. The purpose of the comb unit 400 is to maintain the steel wires or cables 50 in alignment and to provide slots of reduced flow cross-section to create a desired back pressure in the polymer flow, so that the polymer is caused to penetrate the individual strands of the wires of cables 50.

The comb unit 400 is also configured to enable the production of a coplanar reinforcement array. This is achieved by controlling and limiting cross flows, which tend to distort an array of cables. More particularly, the comb unit 400 includes a diverging exit channel 402 that prevents cross flows.

Between the other first runner plate 240 and the comb plate 250, there is formed a first combining chamber or zone, in which the cables 50 are combined with the first polymer flow, so as to be embedded therein.

Figure 16D:
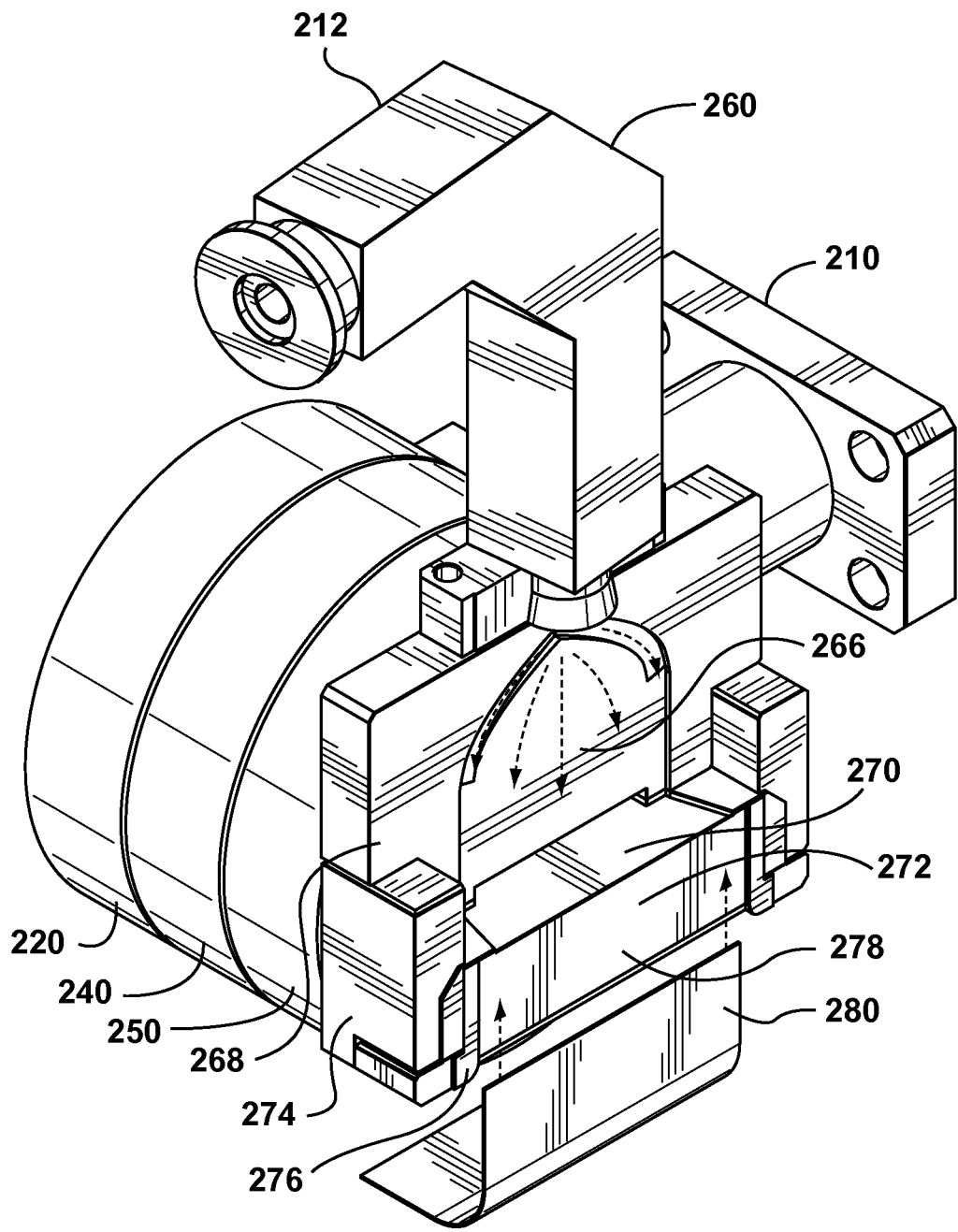
Figure 16E:
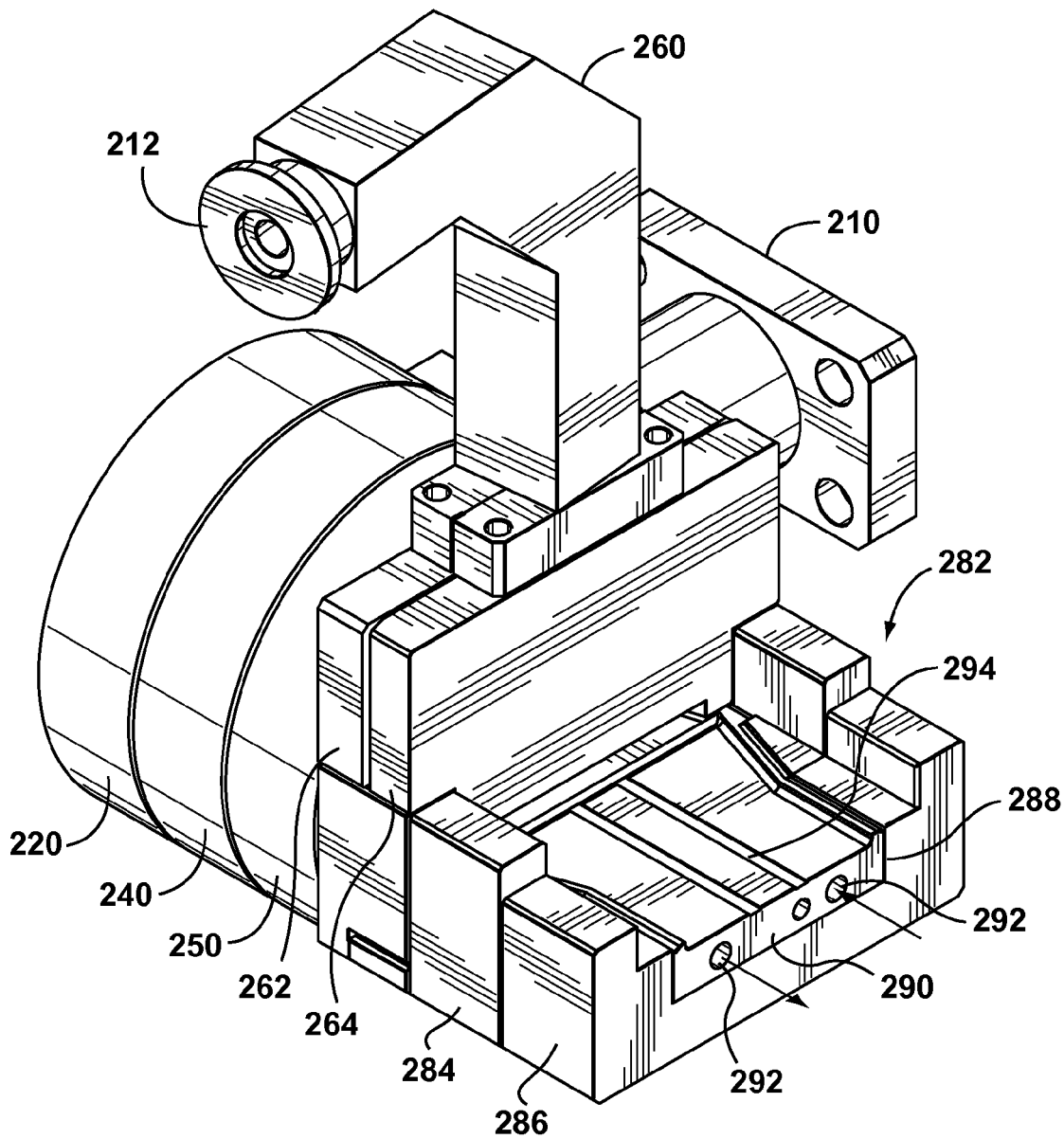

Details of an inlet runner arrangement for a second polymer flow are shown in FIGS. 16d and 16e. A second inlet runner 260 provides a flow of a second polymer from the inlet 212 to a runner defined between a pair of second runner plates 262 and 264. As shown in FIG. 16d, the second runner plate 262 has a recessed portion 266 on a front face 268 defining a flow area or manifold that diverges to provide a uniform flow across the width of the extrudate section comprising the primary polymer and the reinforcing wires or cables 50. The second inlet runner 260 is completed by the second runner plate 264, that is a plain plate. The second inlet runner 260, as for the first polymer, would be connected to a suitable source of a secondary polymer, e.g., a screw extrusion machine or the like.

The second inlet runner recess or manifold 266 opens into a second combining zone or chamber 270, that is also defined by a bottom element 272. The bottom element 272 comprises first and second parts 274 and 276; as one of these parts 274, 276 defines part of the chamber 270, two parts 274, 276 are provided, to facilitate cleaning.

As shown, the second part 276 is recessed at 278 as to form a slot into which a web of the slider fabric, indicated at 280, can be drawn.

Figure 16F:
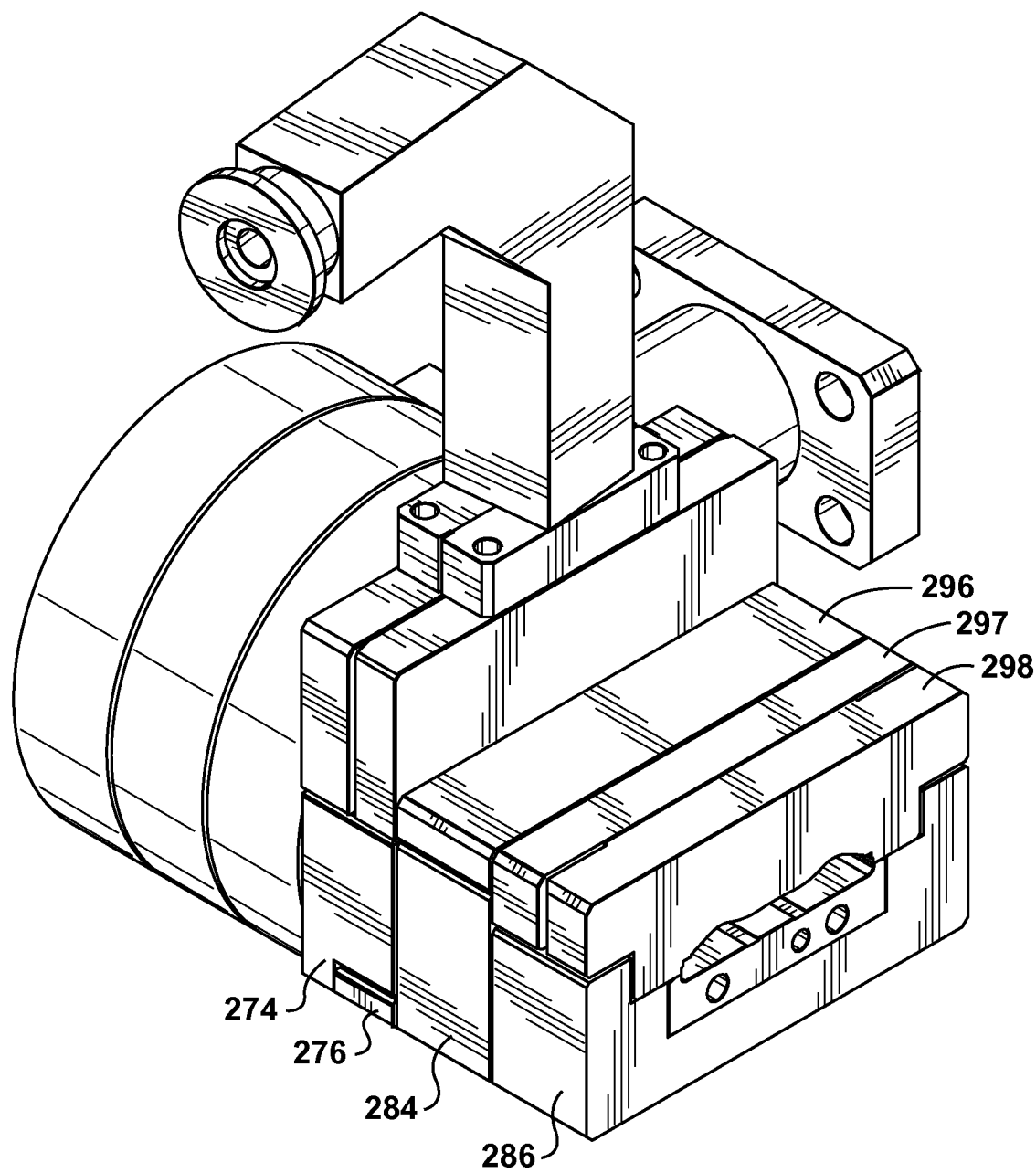

Referring to FIGS. 16e and 16f, the extrudate then passes to an outlet zone 282 that includes first and second bottom die blocks 284 and 286. These die blocks 284, 286 define a channel 288, into which is mounted an extrudate support block 290. This block 290 is provided with openings 292 of ducts for coolant flow. The coolant may be water or oil. Additionally, the extrudate support block 290 can be mounted so as to be spaced from the bottom die blocks 284, 286 to reduce heat transfer to the extrudate support block 290 from the bottom blocks 284, 286. Ceramic coatings can also be used. These features provide for thermal insulation.

In some examples, the cooling block 290 can be formed of steel. In other examples, the cooling block 290 can be formed of a high temperature plastic, for example but not limited to, CELAZOLE™ or TORLON™. High temperature plastics typically have a relatively low heat capacity and heat transfer coefficient, resulting in less heat transferred to the slider fabric in the die. However, steel may be the preferred material for the cooling block 290 for its lower cost, each of fabrication and wear properties.

To assist in guiding the slider bearing the extrudate, the top surface of the extrudate support block 290 can be provided with two shallow rectangular slots or guides 294. As shown in FIG. 16e, side edges of the block 290 are slanted inwards, to progressively cause the side edges of the slider fabric 280 to fold up, and roll around edges of the molten thermoplastic.

FIG. 16d shows the location of the die where the secondary polymer flow and the fabric are added. The secondary polymer is spread over the primary polymer and reinforcement in a manifold. The fabric 280 enters the die from the bottom and is brought up under the combined polymers and reinforcement array. The fabric is supplied to the die at a temperature lower, and it may be significantly lower, than the melt or die temperatures, approximately 50° C. This limits the maximum temperature the fabric will achieve in the process. The fabric can also be supplied preshrunk and at, effectively, zero tension by providing feed devices immediately outside the die. Further details of suitable slider pretreatment are provided with reference to the applicant's U.S. Provisional Patent Application No. 60/971,156, filed on 10 Sep. 2007 and entitled "Method And Apparatus For Pretreatment Of A Slider Layer For Extruded Composite Handrails", and the corresponding PCT Application WO/2009/033273 filed on 10 Sep. 2008.

Referring to FIGS. 16d and 16f, to complete the outlet zone 282, a top die block 296 is mounted above the first outlet die block 284, and a pair of top die blocks 297 and 298 are mounted above the second bottom die block 286.

The top die blocks 296, 297, 298 can be, to at least some extent, thermally isolated from the bottom die blocks 284, 286, e.g., by being provided with spacing, and these in turn are spaced or otherwise thermally isolated with respect to the extrudate support block 290. The top die blocks 296, 297, 298 can be heated by band heaters as heating devices, to keep the extruded thermoplastic polymer of a desired temperature. It will be understood that any thermal isolation will never be perfect and at best will only reduce heat transfer.

The cable mandrel 300 is shown in FIGS. 17a to 17e. As mentioned, it includes a cylindrical plug 302 and a flange 304. Within the plug 302, there is an internal bore 306.

At the end of the cylindrical plug 302, a plurality of small bores 308 are provided in a common plane. Each of these bores 308 has a portion of small diameter and a portion of larger diameter. Thin walled hypodermic steel tubes 310 are mounted in the smaller diameter sections of the bores 308. The steel tubes 310 can be replaced individually as required.

As shown, the front of the cylinder plug 302 shows a slightly protruding ridge section 312, with the ends of the tubes 310 opening onto the top of this ridge section 312.

To assemble the components of the die assembly 200, appropriate bores, threaded, plain or otherwise, can be provided for assembly purposes, in known manner.

The comb unit 400 is shown in detail in FIGS. 18a to 18d. The comb unit 400 essentially comprises first and second rectangular blocks 404 and 406. The diverging exit channel 402 is provided on the top surface of the second rectangular block 406, with the top surfaces of the blocks 404, 406 otherwise being coextensive.

In the middle and extending up to the top surface of the first rectangular block 404, there is a comb section 410. This comb section 410 is defined by rectangular slots 412 and 414. The slots 412 can be provided towards the outer sections of the comb 410 and extend through the full depth of the comb section 410.

Figure 18A:
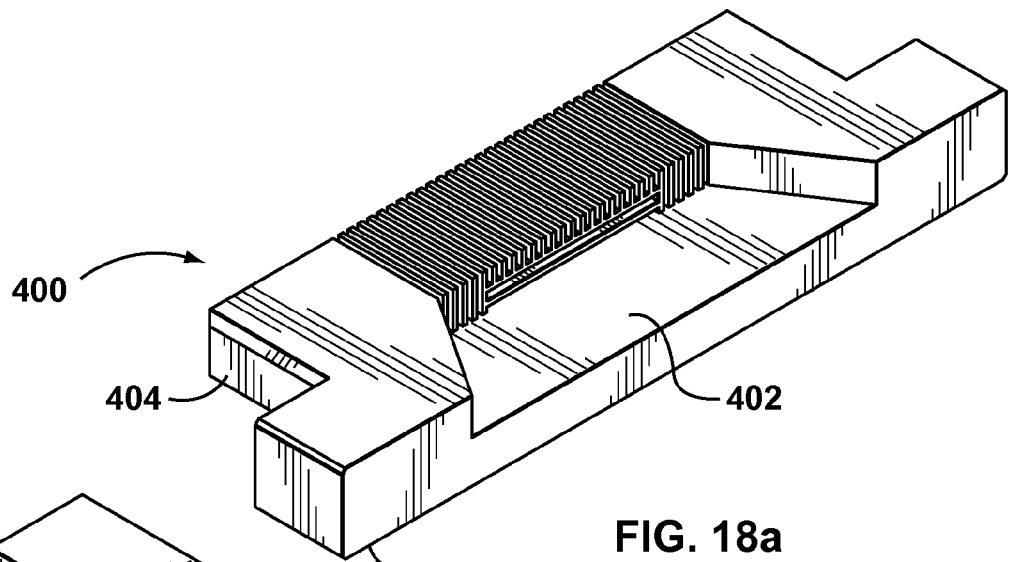
FIG. 18a is a perspective view of a comb unit from one end.
Figure 18B:
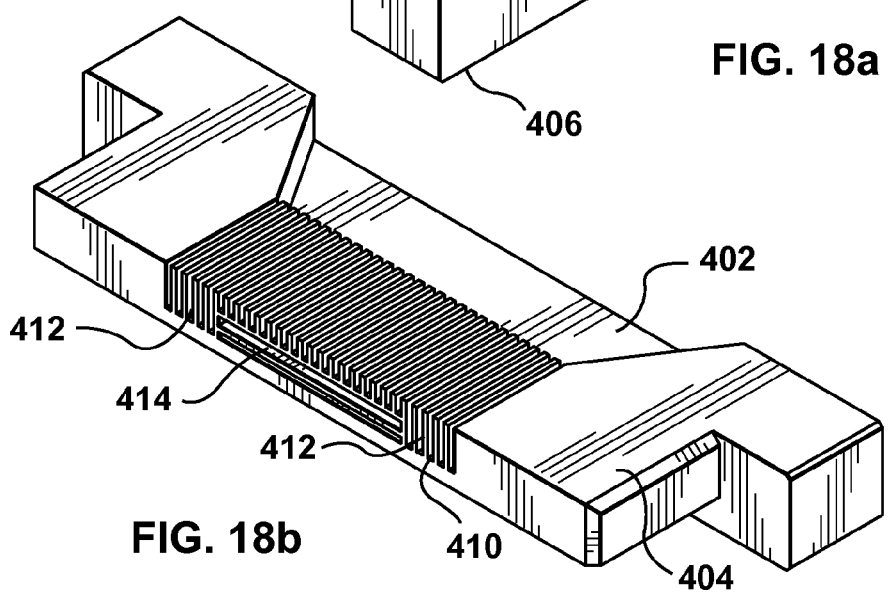
FIG. 18b is a perspective view of the comb unit from another end.
Figure 18C:
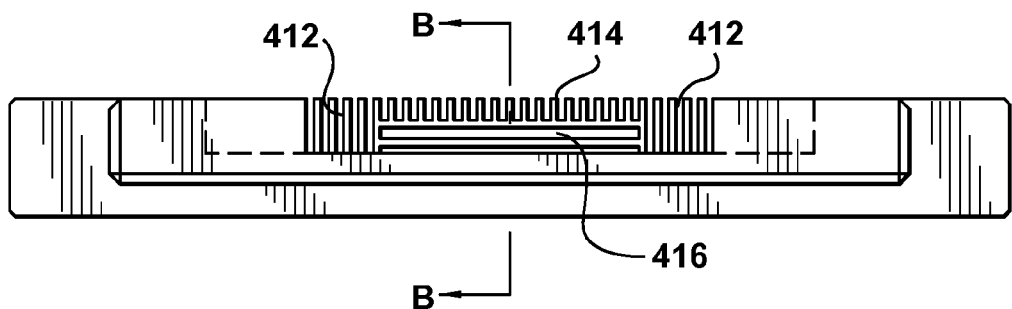
FIG. 18c is an end view of the comb unit.
Figure 18D:
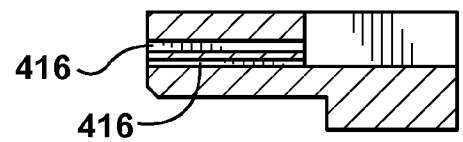
FIG. 18d is a cross-sectional view along lines DD of FIG. 18c.

In the middle of the comb section 410, the slots 414 extend part way through the comb section 410, and below them, there are two horizontal slots or openings 416, as shown best in FIGS. 18c and 18d. In this example, there are 18 slots 414 and 10 slots 412, for a total of 28 slots. There are twenty (20) steel cables or wires 50 in this example, and these pass through the top horizontal opening 416 to keep them in one plane.

The first polymer is delivered through the first runner plate 220 and is forced to pass through the slots 412, 414 and slot openings 416, not otherwise occupied by the steel cables 50. This can serve to generate back pressure, and force the polymer or thermoplastic into the interstices between the individual strands of each wire, cable or stretch inhibitor 50.

It is to be noted that while this described example has 20 cables and 28 slots 412, 414 are provided in total, these numbers could vary as desired. Additionally, this arrangement can be modified to accommodate other types of stretch inhibitor. For example, for a steel tape stretch inhibitor, it would be necessary to have one single horizontal slot to accommodate such a stretch inhibitor. For some applications, it might prove preferable to first pass the steel cables though an extrusion machine to form a molded thermoplastic strip in which the steel cables are already imbedded. Such a thermoplastic strip would be of generally rectangular of cross section and would be supplied to the suitable extrusion apparatus for extruding the complete handrail cross-section in much the same manner as a steel tape stretch inhibitor.

In use, the steel cables 50 can first be processed to provide them with adhesive, e.g., a modified epoxy adhesive, as shown in FIG. 14, or a similar technique. The steel cables 50 are then supplied to the tubes 310 of the cable mandrel 300. Simultaneously, a first polymer is supplied to the first runner plate 220 and is delivered through the channels 226 to the combining chamber 234, where it flows around either side of cables 50 to in embed the cables 50 in the thermoplastic flow.

The combined steel cable and thermoplastic flow then passes through the comb section 410 of the comb unit 400. The restricted flow cross-section of the comb section 410 can cause significant back pressure, that can serve to force or pressurize the thermoplastic into the spaces or interstices in between the individual strands of the cables 50.

After passing through the comb unit 400, the first thermoplastic flow with the steel cables 50 enters the second combining chamber or zone 270, where the second polymer flow is supplied to form a top layer on the extrudate, this second polymer flow being supplied from the second inlet 212 and through the second inlet runner 260.

As the flow passes over the extrudate support block 290, it meets the fabric web 280 introduced through the slot 278 and these are combined in the outlet zone 282.

The entire die assembly 200 can be uniformly heated with standard band heaters and the temperature is controlled between 175° C. and 210° C., for example. The two parts of the die 284, 286 below the cooled block 290 need not be heated, and the contact of these to the upper final die parts can be minimized. Heat can be applied to the final zone of the die from the top only. This enables the greatest possible temperature difference between the parts of the die that contact the molten polymer and the cooled block which contacts the fabric. Using the configuration as shown allows the cooled block 290 to be held at a temperature below 75° C., with the rest of the die at 200° C. Contact with the molten polymer still causes a temperature increase but this is much less than without the cold zone. Using this setup it is possible to control the fabric stretch in the die to less than 4%.

It will be understood that while exemplary temperatures and other parameters have been given, these temperatures and other parameters can be varied depending upon characteristics of materials used and other parameters.

The completed extrudate exits the die through the final opening 204 or outlet, and can then pass to the support mandrel as shown in earlier figures.

Further processing of the extrudate to form the desired shape, e.g., shaping into an extruded handrail on the mandrel, can then take place as described above. The mandrel or former need not be secured to the die, and it is possible to provide for some relative displacement between the die assembly and mandrel.

Figure 19A:
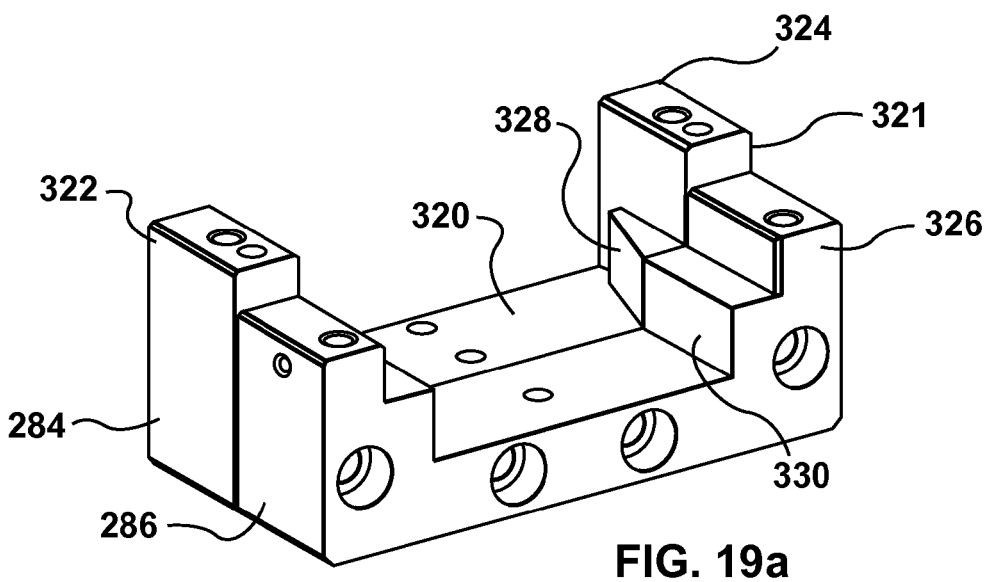
FIGS. 19a, 19b and 19c are perspective views of outlet die blocks.
Figure 19B:
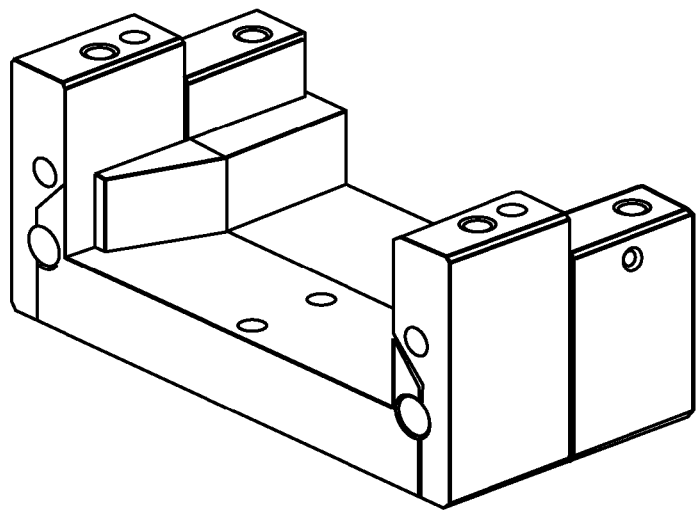
Figure 19C:
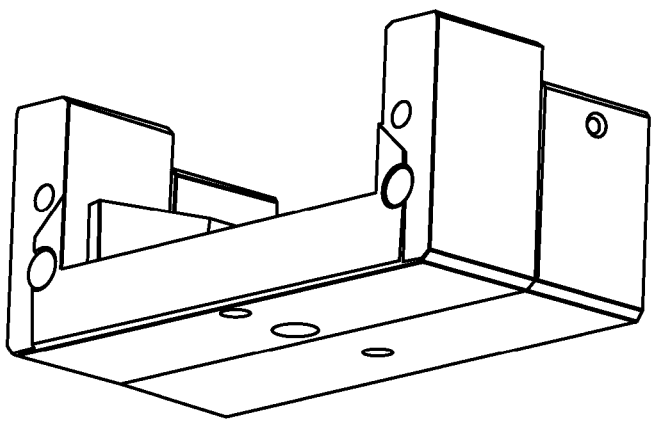

Referring to FIGS. 19a, 19b and 19c, the outlet die blocks 284 and 286 can be integrally formed with one another. As shown, the die blocks 284, 286 have a base portion 320 and side portions 321 and 322, which can be mirror images of one another. Each side portion 321, 322 includes two outer parts 324 and 326 of differing heights. Inside the outer parts 324, 326 there is an inclined portion 328 and an inner portion 329. The inclined portion 328 and the inner portion 329 are configured to conform to the profile of the extrudate support block 290, detailed below in relation to FIGS. 20a, 20b.

Figure 20A:
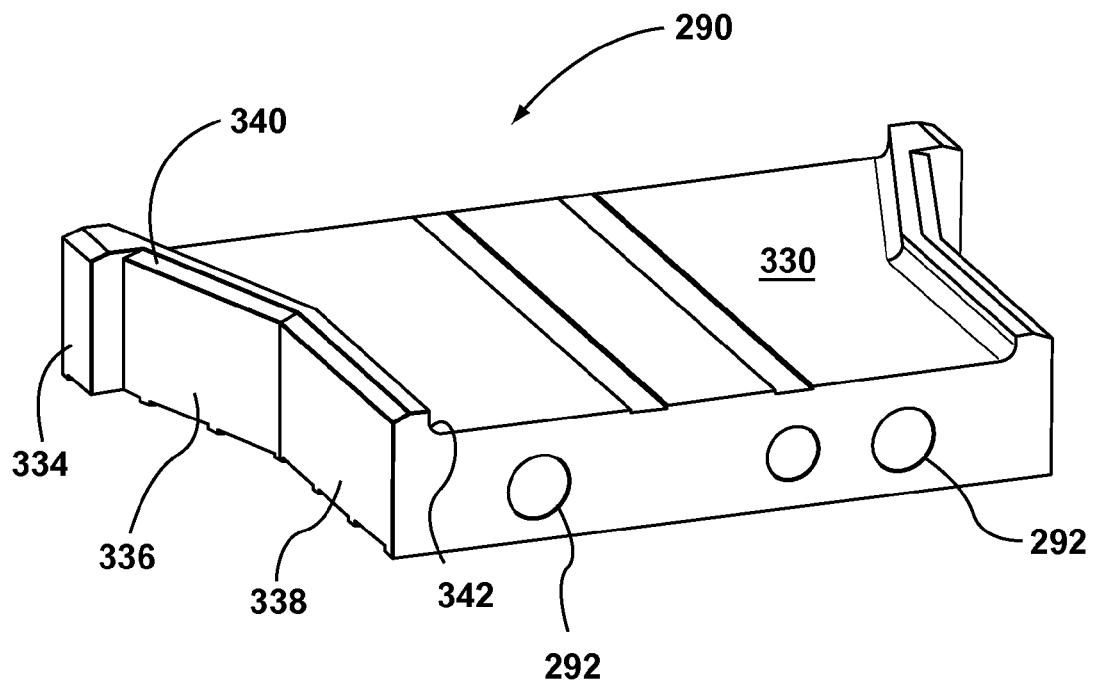
FIGS. 20a and 20b are perspective views of an extrudate support block.
Figure 20B:
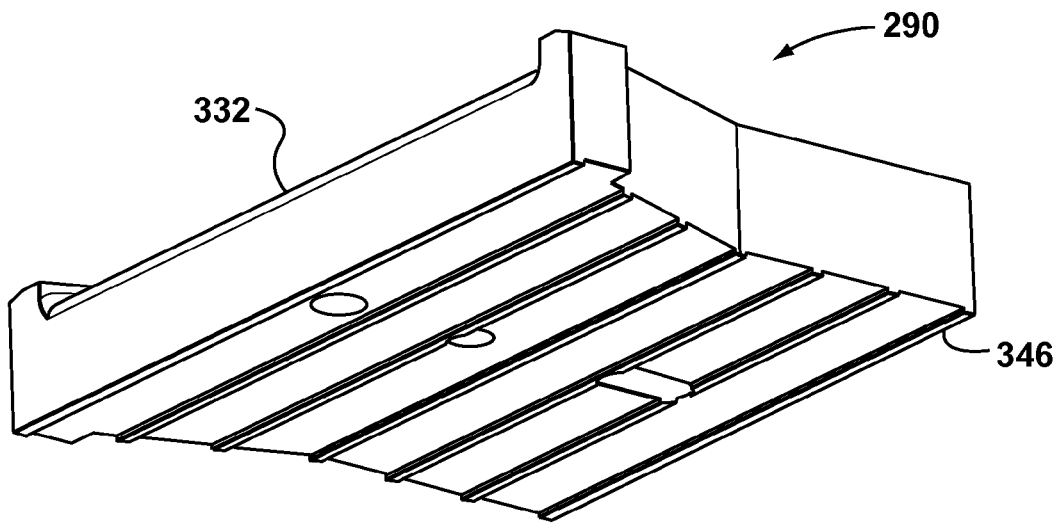

Referring to FIGS. 20a, 20b, the extrudate support block 290 is generally planar and includes a generally flat central surface 330, for supporting the slider fabric 280. As shown at 332, a rounded edge can be provided to enable the slider fabric 280 to pass freely through the slot 278 onto the flat top or central surface 330.

The support block 290 has side faces adapted to conform to the portions 328, 330 of the outlet die blocks 284, 286. Thus, the extrudate support block 290 includes, on each side, a first short planar side face 334, an inclined side face portion 336 and in inset planar side face portion 338, with the planar side face portions 334, 338 all being parallel to one another.

The side face portions 334, 336, 338 extend upwards to form, on each side, an upper lip 340. An inner face 342 of each upper lip 340 includes a generally vertical top portion and a rounded lower portion that merges smoothly into the top surface 330. Viewed in plan, the lips 340 each have an inclined section and a straight section, aligned in parallel to the axis of the die. This configuration is intended to cause edges of the slider fabric 280 to fold up progressively around the extrudate.

As best shown in FIG. 20b, the bottom of the extrudate support block 290 is provided with a series of narrow ribs 346, so that when mounted on the outlet die blocks, 284, 286 the contact area is minimized, to tend to reduce heat transfer by conduction at least between the various elements of the die. Openings 292 for coolant flow are again shown in FIG. 20a.

Figure 21A:
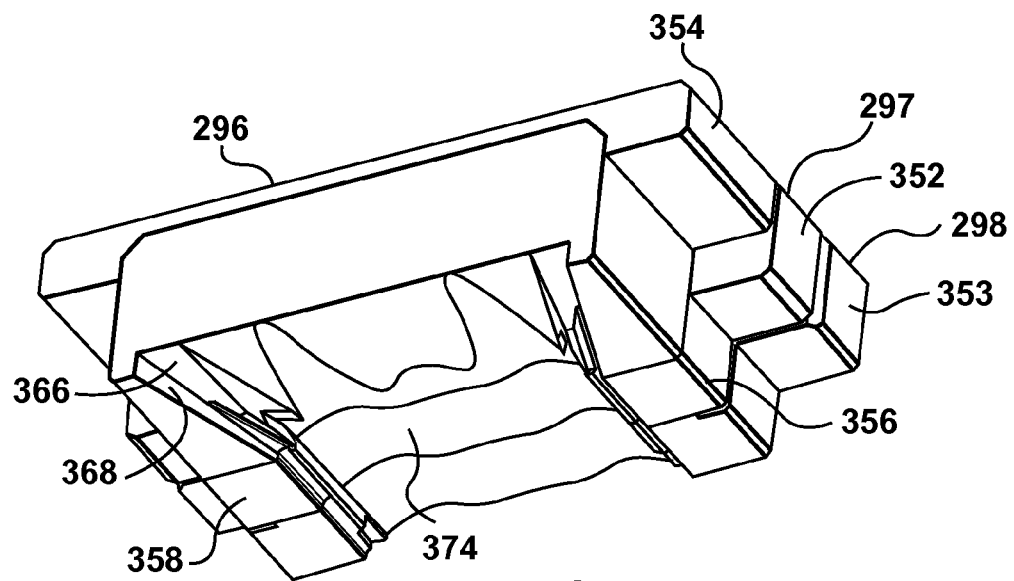
FIGS. 21a and 21b are perspective views of top die blocks.
Figure 21B:
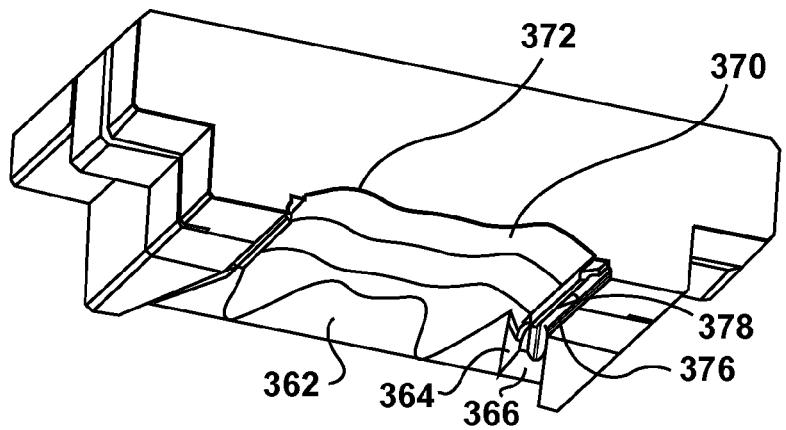
Figure 21C:
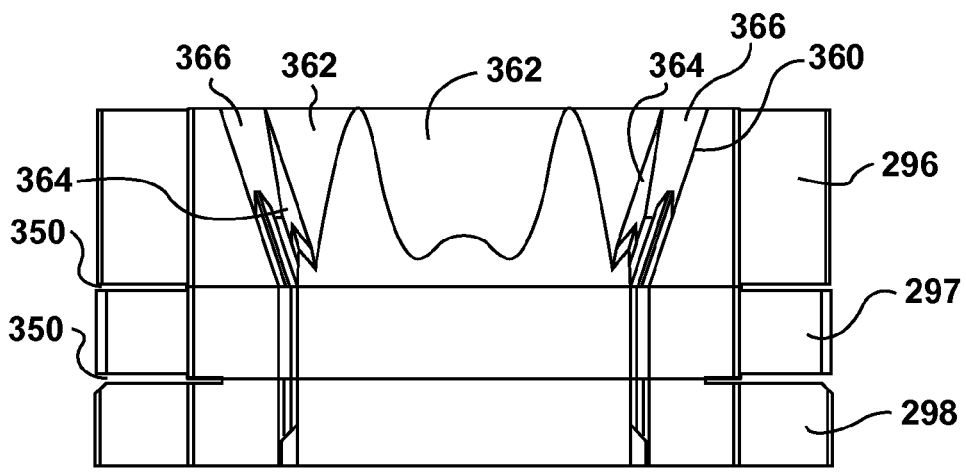
FIG. 21c is a view from underneath of the top die blocks of FIGS. 21a and 21b.

Referring to FIGS. 21a, 21b, 21c, the die blocks 296, 297 and 298, are similarly, formed as a similar unit. As best shown in FIG. 21c, slots 350 extend partially between the blocks 296, 297. It is here noted that the blocks 284, 286 are substantially separated by slots on the sides and the bottom thereof.

The top surfaces of the blocks 296, 297, 298 are generally planar. Along the sides, the forward most blocks 297, 298, show projections 352 and 353 of generally similar section, while the rear most block 296 shows a projection 354 of lesser depth. It will be understood that the projections 352, 353, 354 are mirror images of each other on either side.

The blocks 296, 297, 298 then have central portions, generally indicated at 358 that project down and provide a generally common outer side surface 356 on each side.

The central portion 358 of the rear most block 296 has a profile corresponding to the rear portion of the extrudate support block 290. It includes inclined edges 360. A central surface 362 extends upwards toward the front of the central portion 358 and inclined side surfaces 364 meet the central surface 362 at an angle. Outer side surfaces 366 are in a common plane, and incline upwardly at a smaller angle than the central surface 362. Outer side edge surfaces 368 are provided. Shallow grooves 370 are provided to assist in guiding upper edges of the slider fabric. Within the central surface 362, there is the beginning of a rounded surface 370 whose profile is best indicated at 372 in FIG. 21b.

The rounded surface 370 continues as indicated at 374 into the central portion of the block 297. This block 297 includes generally vertical short side surfaces 376, and projecting downwardly and parallel to the side surfaces 374, a narrow projection 378 on each side. The projections 378 are intended again to assist in guiding the side edges of the slider fabric.

The frontmost die block 298 again has a central surface that is rounded and follows the shape shown by the edge 372. The narrow projections 378 continue into the die block 298, and terminate before the exit from the die block 298, so that the extrudate can adopt its final profile before exiting from the die.

While the applicant's teachings are described in conjunction with various embodiments, it is not intended that the applicant's teachings be limited to such embodiments. The applicant's teachings encompass various alternatives, modifications, and equivalents, as will be appreciated by those of skill in the art.

We claim:

1. A die assembly for extruding an article comprising a thermoplastic polymer and a stretch inhibitor, the die assembly comprising:
    a first inlet for a first thermoplastic polymer;
    an entrance for the stretch inhibitor;
    a first combining zone wherein the first thermoplastic supplied above and below the stretch inhibitor, whereby the stretch inhibitor is embedded in the first thermoplastic polymer;
    an outlet;
    an element of restricted flow cross-section located upstream from the outlet relative to the movement of the article and the stretch inhibitor through which the first thermoplastic polymer and the stretch inhibitor pass, whereby the element of restricted flow cross-section generates back pressure to promote penetration of the first thermoplastic polymer into the stretch inhibitor;
    a second combining zone and a second inlet for a second thermoplastic polymer located downstream from the element of restricted flow cross-section, wherein in the second combining zone, the second thermoplastic polymer is combined with the flow of the first thermoplastic polymer and the stretch inhibitor, on one side thereof;
    an inlet slot for an elongate web of fabric, for bonding to one side of the thermoplastic polymer; and
    an extrudate support block, the die assembly being configured so that the fabric passes over the extrudate support block and supports the extrudate, the extrudate support block comprising at least one inlet and at least one outlet for cooling fluid.

2. The die assembly of claim 1, further comprising
    heating devices for heating elements of the die assembly remote from the extrudate support block.

3. The die assembly of claim 2, wherein the extrudate support block comprises thermal insulation limiting heat transfer from other elements of the die assembly to the extrudate support block.

4. The die assembly of claim 1, wherein the element of restricted flow cross-section comprises a comb unit, the comb unit comprising a plurality of slots of reduced flow cross-section to create the back pressure.

5. The die assembly of claim 4, wherein the comb unit further comprises a horizontal opening that receives the stretch inhibitor, and the plurality of slots generally surround the horizontal opening.

6. The die assembly of claim 5, wherein each of the plurality of slots extend generally vertically.

7. The die assembly of claim 5, wherein the comb unit further comprises a diverging exit channel.

8. The die assembly of claim 1, wherein a top of the extrudate support block comprises a generally flat central surface, the central surface comprising at least one shallow guide for guiding the fabric bearing the extrudate.

9. The die assembly of claim 1, wherein side edges of the extrudate support block each comprise an upper lip that is slanted inwardly, to progressively cause side edges of the fabric to fold up and roll around edges of the extrudate.

10. The die assembly of claim 1, further comprising at least one bottom die block having a channel, the extrudate support block being mounted in the channel, a bottom of the extrudate support block comprising a plurality of narrow ribs for minimizing contact area with the at least one bottom die block to reduce heat transfer by conduction.

11. The die assembly of claim 1, further comprising at least one top die block mounted above the extrudate support block and thermally insulated with respect to the extrudate support block, and heating devices for the at least one top die block to keep the extrudate at a desired temperature.

12. The die assembly of claim 1, further comprising ducts for the cooling fluid for cooling the extrudate support block.

13. The die assembly of claim 1, wherein the extrudate support block comprises thermal insulation limiting heat transfer from other elements of the die assembly to the extrudate support block.

14. The die assembly of claim 8, wherein side edges of the extrudate support block each comprise an upper lip that is slanted inwardly, to progressively cause side edges of the fabric to fold up and roll around edges of the extrudate.

15. The die assembly of claim 10, further comprising at least one top die block mounted above the extrudate support block and thermally insulated with respect to the extrudate support block, and heating devices for the at least one top die block to keep the extrudate at a desired temperature.

16. A die assembly for extruding an article comprising thermoplastic material and a stretch inhibitor, the die assembly comprising:
   a first inlet for a thermoplastic material;
   an entrance for the stretch inhibitor;
   a combining zone wherein the stretch inhibitor is embedded in the thermoplastic material;
   an inlet slot for an elongate web of fabric; and
   an element of the die assembly that contacts the fabric during passage through the die assembly and that comprises at least one of ducts for a cooling fluid for cooling for the element, and thermal insulation from other elements of the die assembly to reduce heat transfer to the fabric,
   wherein the element comprises an extrudate support block, the die assembly being configured so that the fabric passes over the extrudate support block and supports the extrudate, and
   wherein the extrudate support block comprises at least one inlet and at least one outlet for cooling fluid.

17. The die assembly of claim 16, wherein the die assembly comprises an outlet for an extrudate formed from the thermoplastic material and comprising the stretch inhibitor, and wherein the inlet slot is located adjacent the outlet such that the fabric is brought up against the extrudate to support the extrudate while the extrudate cools and solidifies.

18. A die assembly for extruding an article comprising thermoplastic material and a cable array for inhibiting stretch, the die assembly comprising:
   a cable mandrel for supplying cables, the cables extending in a plane;
   at least one first runner plate secured to the cable mandrel, the at least one first runner plate connected to a first inlet for receiving a supply of a first thermoplastic material, the at least one first runner plate comprising channels for directing flow of the first thermoplastic material to both sides of the plane of the cables, to embed the cables supplied by the cable mandrel;
   at least one second runner plate secured to the at least one first runner plate, the at least one second runner plate connected to a second inlet for receiving a supply of a second and different thermoplastic material, the at least one second runner plate comprising channels for directing flow of the second thermoplastic material onto the first thermolplastic material;
   a comb plate located between the at least one first runner plate and the at least one second runner plate, the comb plate comprising slots of reduced flow cross-section to create a back pressure in flow of the first thermoplastic material;
   an inlet slot for drawing an elongate web of slider fabric up under the extrudate for bonding to the first thermoplastic material; and
   an extrudate support block, the die assembly being configured so that the slider fabric passes over the extrudate support block and supports the extrudate, the extrudate support block comprising at least one inlet and at least one outlet for cooling fluid.

19. The die assembly of claimed in claim 18, wherein each of the cable mandrel, the at least one first runner plate, the comb plate and the at least one second runner plate are configured to be disassembled from one another to facilitate cleaning.

20. The die assembly of claim 18, wherein the comb plate further comprises a horizontal opening that receives the cables, and the slots generally surround the horizontal opening.

* * * * *